United States Patent
Aaron et al.

(10) Patent No.: US 10,119,762 B2
(45) Date of Patent: *Nov. 6, 2018

(54) DRYER SYSTEM WITH IMPROVED THROUGHPUT

(75) Inventors: Charles E. Aaron, Buchanan, VA (US); Duane A. Boothe, Clifton Forge, VA (US); John M. Linkenhoker, Eagle Rock, VA (US); Kerry P. Morris, Troutville, VA (US); Samuel F. Hannah, Eagle Rock, VA (US); Wayne L. Smith, Troutville, VA (US); Thomas C. Wenrich, Troutville, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 678 days.

This patent is subject to a terminal disclaimer.

(21) Appl. No.: 13/533,636

(22) Filed: Jun. 26, 2012

(65) Prior Publication Data

US 2012/0266482 A1    Oct. 25, 2012

Related U.S. Application Data

(63) Continuation of application No. 12/552,163, filed on Sep. 1, 2009, now Pat. No. 8,205,350.
(Continued)

(51) Int. Cl.
*F26B 17/30* (2006.01)
*F26B 17/24* (2006.01)
(Continued)

(52) U.S. Cl.
CPC ............... *F26B 17/24* (2013.01); *B29B 9/16* (2013.01); *F26B 5/08* (2013.01)

(58) Field of Classification Search
CPC ............... B29B 9/16; F26B 17/24; F26B 5/08
(Continued)

(56) References Cited

U.S. PATENT DOCUMENTS

| 106,177 A | 8/1870 | Knox |
|---|---|---|
| 1,525,449 A | 2/1925 | Johnson |

(Continued)

FOREIGN PATENT DOCUMENTS

| CN | 1782646 A | 6/2006 |
|---|---|---|
| CN | 101718486 A | 6/2010 |

(Continued)

OTHER PUBLICATIONS

Official Office Action dated Nov. 18, 2013 for related Japanese Patent Application No. 2011525294.
(Continued)

*Primary Examiner* — Jessica Yuen
(74) *Attorney, Agent, or Firm* — Troutman Sanders LLP; Ryan A. Schneider; John Morrissett

(57) ABSTRACT

A centrifugal dryer that has improved throughput capacity resulting from the combination of a high angle agglomerate catcher with optional overflow, increased dewatering capacity, a cylindrical dewatering feed chute, a modified rotor design with positionally and structurally modified lifters in the feed and dewatering section, the drying and propagating section, as well as the pellet discharge section, and an efficient circumferential foraminous membrane.

19 Claims, 36 Drawing Sheets

Related U.S. Application Data

(60) Provisional application No. 61/093,588, filed on Sep. 2, 2008, provisional application No. 61/112,320, filed on Nov. 7, 2008, provisional application No. 61/219,192, filed on Jun. 22, 2009.

(51) Int. Cl.
*F26B 5/08* (2006.01)
*B29B 9/16* (2006.01)

(58) Field of Classification Search
USPC .......................................... 34/58, 59, 79, 312
See application file for complete search history.

(56) References Cited

U.S. PATENT DOCUMENTS

| | | |
|---|---|---|
| 2,133,974 A | 10/1938 | Cowles |
| 3,199,215 A | 8/1965 | Jesse et al. |
| 3,458,045 A | 7/1969 | Dudley |
| 3,477,098 A | 11/1969 | Swickard et al. |
| 3,675,697 A | 7/1972 | Muller |
| 3,691,644 A | 9/1972 | Schnitzer |
| 4,218,323 A | 8/1980 | McCracken |
| 4,447,325 A | 5/1984 | Pauley |
| 4,476,019 A | 10/1984 | Nowisch et al. |
| 4,565,015 A | 1/1986 | Hundley, III |
| 4,896,435 A | 1/1990 | Spangler, Jr. |
| 4,950,313 A | 8/1990 | Dullien et al. |
| 4,991,766 A * | 2/1991 | Hunnicutt et al. ............ 228/175 |
| 5,122,263 A | 6/1992 | Huber |
| 5,265,347 A | 11/1993 | Woodson et al. |
| 5,425,925 A * | 6/1995 | Kline .................... A61L 11/00 422/295 |
| 5,611,150 A | 3/1997 | Yore, Jr. |
| 5,638,606 A | 6/1997 | Bryan et al. |
| 5,987,769 A | 11/1999 | Ackerman et al. |
| 6,063,296 A | 5/2000 | Ackerman et al. |
| 6,138,375 A | 10/2000 | Humphries, II et al. |
| 6,237,244 B1 | 5/2001 | Bryan et al. |
| 6,430,842 B1 | 8/2002 | Hauch |
| 6,438,864 B1 | 8/2002 | Sandford |
| 6,438,866 B1 | 8/2002 | Meydell et al. |
| 6,505,416 B2 | 1/2003 | Sandford |
| 6,739,457 B2 | 5/2004 | Humphries, II et al. |
| 6,807,748 B2 | 10/2004 | Bryan et al. |
| 6,938,357 B2 | 9/2005 | Hauch |
| 7,024,794 B1 | 4/2006 | Mynes |
| 7,171,762 B2 | 2/2007 | Roberts et al. |
| 7,421,802 B2 | 9/2008 | Roberts et al. |
| 8,205,350 B2 * | 6/2012 | Aaron et al. ..................... 34/58 |
| 2003/0033725 A1 | 2/2003 | Humphries, II et al. |
| 2005/0065318 A1 | 3/2005 | Jernigan et al. |
| 2006/0101665 A1 | 5/2006 | Carin et al. |
| 2006/0130353 A1 | 6/2006 | Eloo |
| 2006/0191155 A1 | 8/2006 | Roberts et al. |
| 2007/0039894 A1* | 2/2007 | Cort .............................. 210/695 |
| 2007/0163142 A1 | 6/2007 | Carin et al. |
| 2008/0072447 A1 | 3/2008 | Hehenberger et al. |
| 2008/0289208 A1 | 11/2008 | Bryan |
| 2009/0062427 A1 | 3/2009 | Tornow et al. |
| 2009/0110833 A1 | 4/2009 | Wright et al. |

FOREIGN PATENT DOCUMENTS

| | | |
|---|---|---|
| DE | 1953741 | 5/1971 |
| DE | 2819443 | 11/1979 |
| DE | 4330078 | 3/1994 |
| DE | 9320744 | 1/1995 |
| DE | 19708988 | 10/1997 |
| EP | 1033545 | 9/2000 |
| EP | 1123480 | 8/2001 |
| EP | 1602888 | 12/2005 |
| EP | 1647788 | 4/2006 |
| EP | 1650516 | 4/2006 |
| JP | 6086427 A | 6/1985 |
| JP | 173305 A | 5/1989 |
| JP | 390296 A | 4/1991 |
| JP | 45248 A | 1/1992 |
| JP | 5278856 A | 1/1992 |
| JP | 45248 A | 7/1994 |
| JP | 2003050087 A | 2/2003 |
| JP | 5278856 A | 10/2004 |
| JP | 2005523815 A | 8/2005 |
| JP | 2006142814 A | 6/2006 |
| TW | 254724 B | 5/2006 |
| WO | 2003092902 A1 | 11/2003 |
| WO | 2006069022 | 6/2006 |
| WO | 2008113560 | 9/2008 |
| WO | 2008147514 | 12/2008 |
| WO | 2009059020 | 5/2009 |

OTHER PUBLICATIONS

International Search Report and Written Opinion issued by the Korean Intellectual Property Office for related Application No. PCT/US2009/055769 dated May 12, 2010.

Taiwanese IPO Search Report completed Dec. 29, 2014 for Taiwanese Patent Application No. 098129555.

Australian Examination Report dated Oct. 3, 2014 for Australian Patent Application No. 2009288073.

* cited by examiner

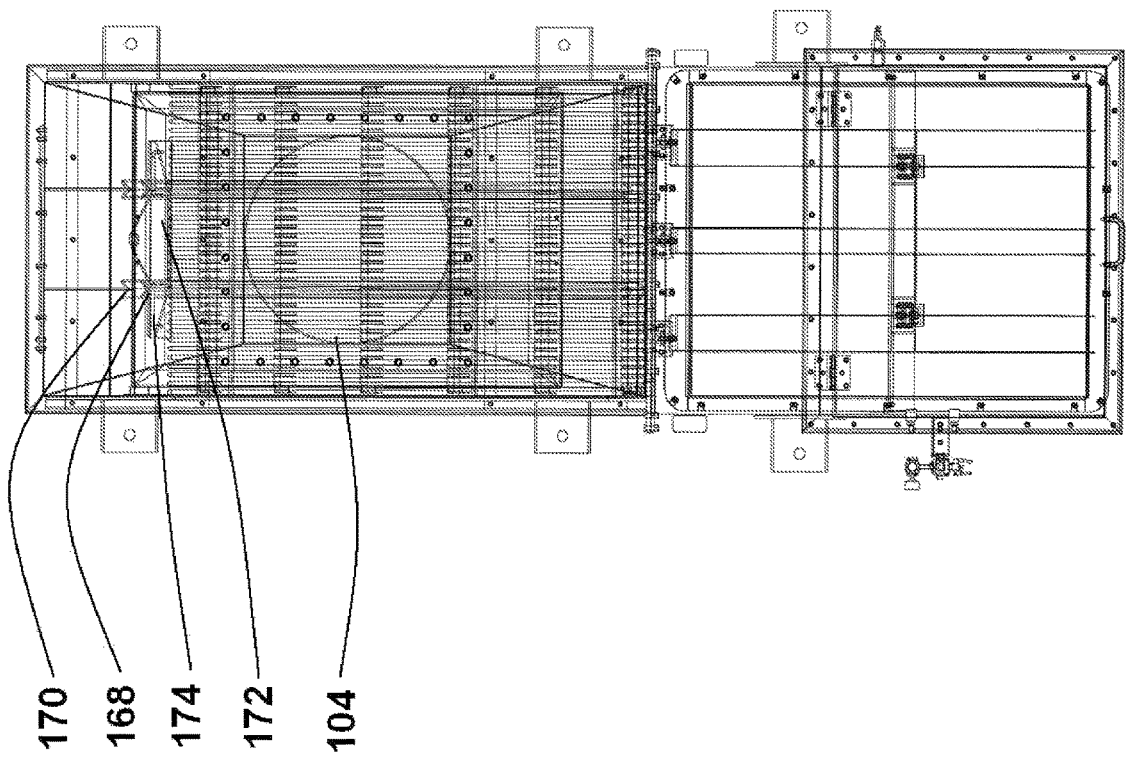

FIG. 30a
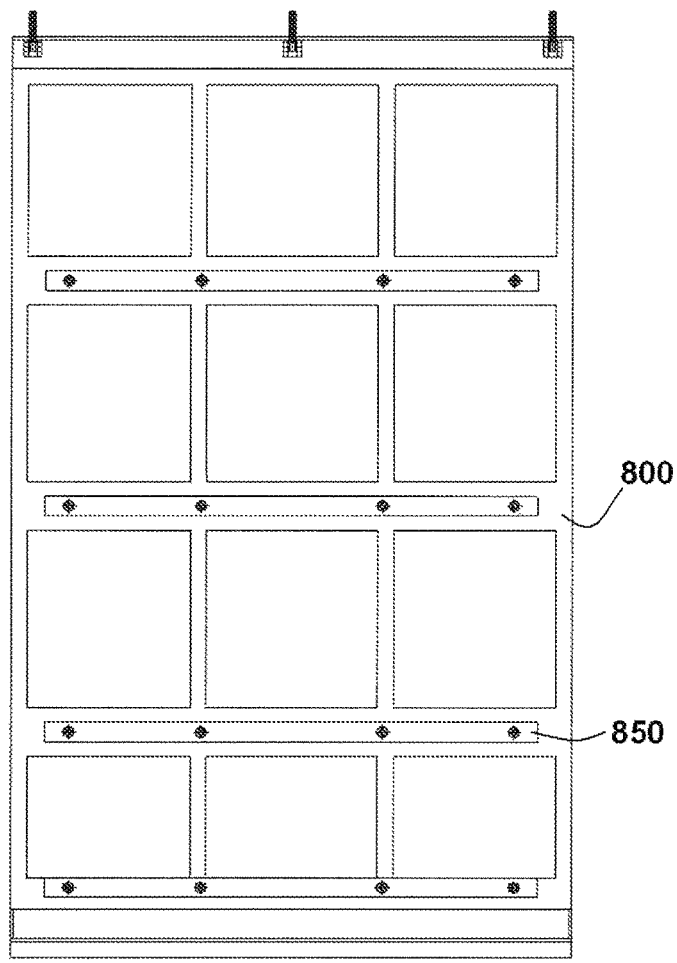
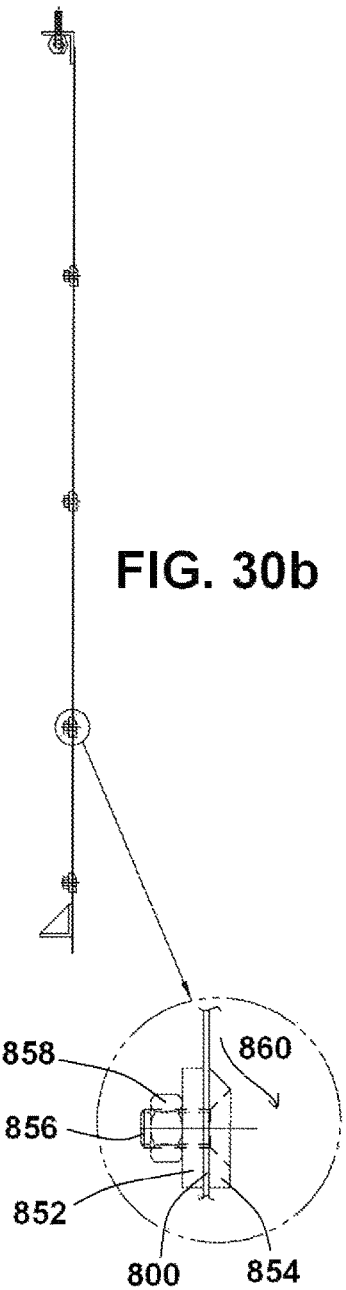
FIG. 30b

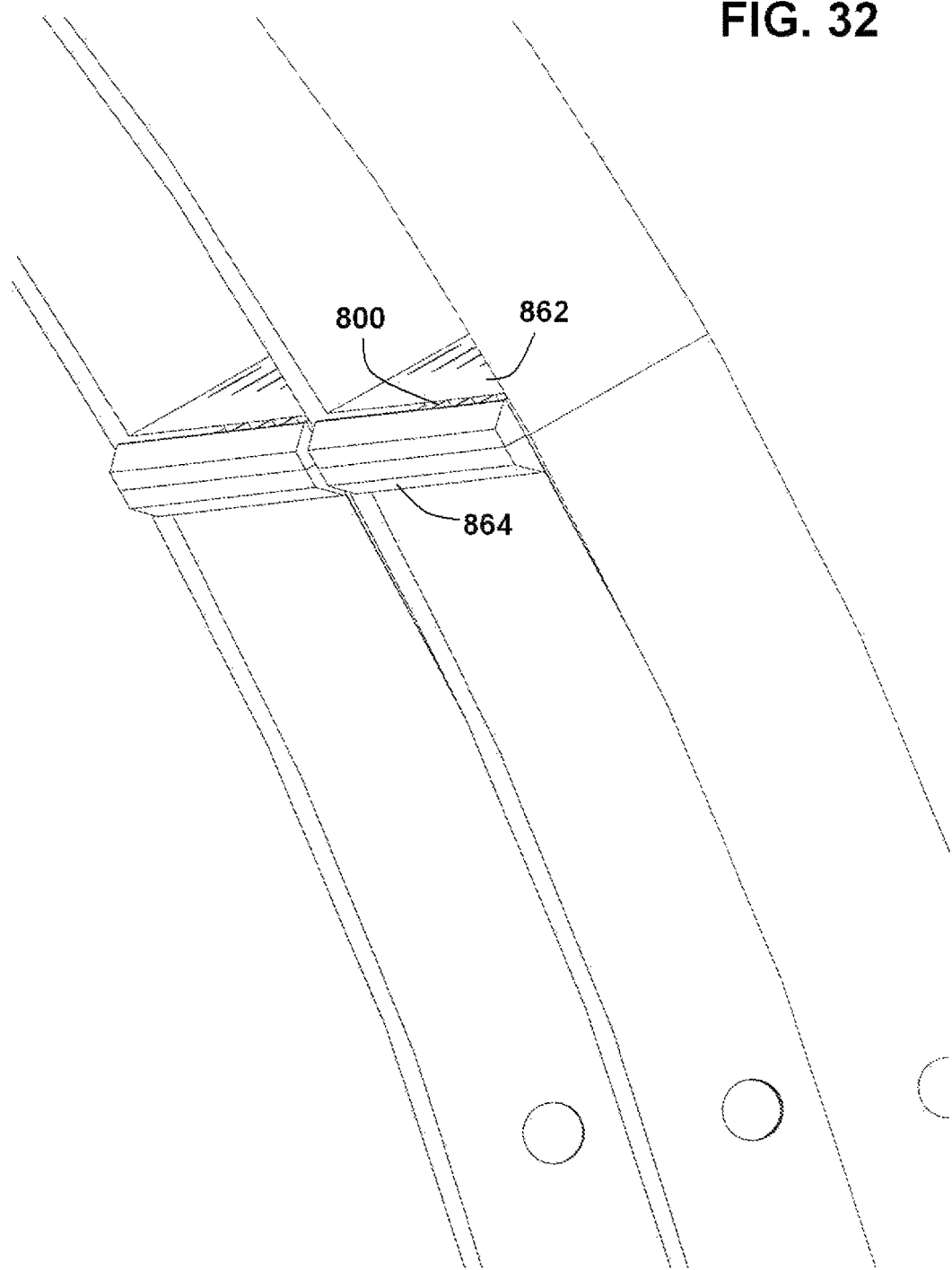

DRYER SYSTEM WITH IMPROVED THROUGHPUT

CROSS-REFERENCE TO RELATED APPLICATIONS

This application is a continuation application of U.S. patent application Ser. No. 12/552,163, filed 1 Sep. 2009, which claims priority to U.S. Provisional Application No. 61/093,588, filed 2 Sep. 2008, U.S. Provisional Application No. 61/112,320, filed 7 Nov. 2008, and U.S. Provisional Application No. 61/219,192, filed 22 Jun. 2009, the contents of which are hereby incorporated by reference as if fully set forth herein.

BACKGROUND OF THE INVENTION

1. Field of the Invention

The present invention relates generally to a dryer system, and a method of drying, that has improved throughput capacity over conventional dryer systems, and more particularly to a dryer system combining a high angle agglomerate catcher with optional overflow, a cylindrical dewatering feed chute for increased dewatering capacity, and a centrifugal dryer with a modified rotor design with positionally and structurally modified lifters and an efficient circumferential foraminous membrane. The present invention increases pellet input and output rates while maintaining the ability to achieve desired pellet moisture content.

2. Description of the Prior Art

The generally independent processes and equipment in the extrusion, pelletization, and drying processes of polymeric material are known. Over time, the demand for dryer systems with high drying capacities has increased.

Drying systems typically include both an agglomerate catcher and dewaterer that receive the slurry of water and plastic particulates in advance of the centrifugal dryer. The agglomerate catcher catches, separates and subsequently discharges agglomerated particulates before the slurry enters the dewaterer. The dewaterer then separates the bulk water from the particulates prior to entrance of the wet particulates to the dryer. Once the bulk of the water has been removed from the particulates, the particulates still include surface moisture that is removed by the centrifugal dryer during elevational and centrifugal movement of the particulates by rotation of the rotor within the dryer and circulation of air by a blower.

An agglomerate catcher is disclosed in U.S. Pat. No. 2,133,974, wherein blades are attached only at the uppermost or inlet end of a casing at a small angle relative to the direction of the inflowing liquid. The blades are arranged lengthwise with the direction of flow and are curved upwardly into the flow in their distal portions. The angle between the edges of the blades and the axis of flow at the distal end is considerably greater than that at the proximal or inlet end. The lower ends of the blades are not secured, and the distance between the blades depends somewhat on the nature of the material and the size and nature of the solid objects. The length of the blades is disclosed as being sufficient to extend completely through the flow. A rounded and smooth baffle can be placed between these blades and the angularly inclined screen that is designed to receive and drain the residue that may slide down. The screen can be pivotally mounted on the casing to allow variation in the angle of inclination as needed.

U.S. Pat. No. 4,447,325 discloses a dewaterer including a vertical dewatering section attached to an angled feed chute screen. The vertical dewatering section includes stationary X-shaped baffle plates that deflect the incoming pellet water slurry, such that the pellets intercept a screen member and are deflected, whereas the water passes through and is removed or recycled. The bulk dewatered pellets then pass downwardly out of the vertical dewatering section onto an angled feed chute comprising a screen member for additional dewatering and ultimately to pass the significantly dewatered pellet mass into the base portion of a dryer. Dewatering feed chute screens are also disclosed in U.S. Pat. Nos. 3,458,045; 4,476,019; and 4,896,435.

An agglomerate catcher and dewaterer is disclosed in U.S. Pat. No. 6,063,296, wherein the pellet slurry is introduced vertically into the agglomerate catcher including a downwardly angled grid of elongate bars or rods spaced a distance apart smaller than the agglomerate dimensions. The rods preferentially are disclosed with saw teeth along their base to further deflect water from the agglomerates. A secondary agglomerate catcher is connected to the principal dewaterer to further dewater the agglomerates prior to removal from the system. From the agglomerate catcher, the pellet slurry enters a cylindrical dewatering area where it is deflected by a cylindrical assembly to which is attached downwardly pointing conical deflectors periodically along its vertical height. The deflectors redirect the pellet slurry to a screen member from which the pellets are deflected and through which the water passes. Attached to the screen and below the downwardly pointing conical deflectors are attached inverted downwardly pointing conical annular rings. These redirect the pellets back toward the centrally located cylinder for additional impact dewatering and subsequent redirection toward the screen as above. The dewatered pellets pass through the base of the dewatering section into a dryer.

Centrifugal pellet dryers conventionally include a vertically disposed outer housing, a cylindrical screen oriented in the housing and a driven bladed rotor positioned centrally in the screen. The rotor moves water laden pellets or other particulates upwardly within the screen with upward and tangential velocity imparted to the particles by impact with the blades, causing the particles to move upward and tangentially outwardly into engagement with the screen for discharge from the upper end of the screen and housing, and water is discharged from the lower end of the housing.

Dryer equipment has been introduced and used in applications following extrusion and pelletization for many years by the assignee as demonstrated in, for example, U.S. Pat. Nos. 3,458,045; 4,218,323; 4,447,325; 4,565,015; 4,896, 435; 5,265,347; 5,638,606; 6,138,375; 6,237,244; 6,739, 457; 6,807,748; 7,024,794; 7,171,762; 7,421,802; U.S. patent application Publication Nos. 2006/0130353, 2008/ 0289208, 2009/0062427, 2009/0110833; World patent application Publication Nos. WO2006/069022, WO2008/ 113560, WO2008/147514, and WO2009/059020; German Patents and Applications including DE 19 53 741, DE 28 19 443, DE 43 30 078, DE 93 20 744, DE 197 08 988; and European Patents including EP 1 033 545, EP 1 602 888, EP 1 647 788, EP 1 650 516, EP 1 830 963. These patents and applications are all owned by the assignee and are included herein by way of reference in their entirety.

A cascade dryer using conical screen devices is disclosed in U.S. Pat. No. 3,199,215. The water pellet slurry enters the uppermost portion of the drier and bulk dewatering is accomplished in the uppermost chamber. The dewatered pellets pass through a conical screen into a sequence of conical screening devices such that the uppermost screen radiates downwardly from its apex and is of slightly smaller diameter than the subsequent and upwardly turned conical screen that is attached to an enclosure. The upwardly turned screen has a through opening in its center to the next sequence of conical screens. To facilitate drying, heated air is introduced near the base of the cascade dryer and moves upwardly through the multiplicity of conical devices.

U.S. Pat. No. 3,477,098 discloses a centrifuge type dryer wherein the pellet slurry is introduced into the center region of a rapidly rotating conical screen. U.S. Pat. No. 5,265,347 introduces the pellet slurry internal to the rotor but adjacent to the inner screen and lifter portion rather than into the central region. U.S. Pat. Nos. 5,611,150; 5,987,769; 6,505,416; and 6,938,357 disclose introduction of the pellet slurry through the center of the rotor, whereas U.S. Pat. Nos. 3,458,045; 4,476,019; 4,565,015; 4,896,435; 5,638,606; 6,438,866; and U.S. patent application Publication No. 2008/0072447 disclose the use of side feeding of the pellet slurry or the dewatered pellet mass into the base of the dryer external to the rotor. U.S. Pat. No. 4,476,019 further discloses a centrifugal dryer in which the rotor and screen assembly can be pivoted out of the housing for ease of access.

Tangential pellet outlets have been known to be highly effective in avoidance of build-up within the centrifugal dryers and as such have been disclosed exemplarily in U.S. Pat. Nos. 3,458,045 and 4,896,435.

Various rotor designs have also been disclosed including solid rotors wherein the cylindrical or tubular shell is essentially a single entity and segmented rotors wherein plates are attached to supports, the composite of which forms the rotor. Solid rotors are disclosed in U.S. Pat. No. 4,565,015 wherein it is described that a cylindrical hollow construction is supported by a web or strut elements. It is further disclosed that a rotor of welded construction or of square tubing has a reduced diameter, eliminates balancing issues, and is more rigid than rotors of a bolted construction. U.S. Pat. No. 5,987,769 similarly discloses an elongate tubular rotor pipe suspended within the interior of a screen member. U.S. Pat. Nos. 3,458,045; 4,218,323; 5,265,347; and 5,638,606 disclose use of various supportive structural elements or spiders to which are attached backplates essentially comprising the rotor.

In order for the rotor to effectively lift the pellets away from the remaining fluid up, through, and out of the dryer, various designs of blades have been disclosed. U.S. Pat. No. 4,565,015 discloses essentially rectangular-shaped angled lifting blades vertically along the length of the rotor as well as radial blades on the uppermost portion of the rotor designed to redirect the pellets from the rotor out the pellet outlet chute and away from the drying apparatus. U.S. Pat. No. 5,987,769 discloses the use of blades that are illustrated as essentially rectangular shaped affixed to the rotor in an angular configuration. Between these blades are linear blades parallel to and along the length of the rotor axis—described as kickers. Scraper blades, disclosed as being L-shaped are attached to the uppermost portion of the rotor to deflect pellets out and away from the dryer. The scraper blades are disclosed in alignment with the angular blades as well as the linear or kicker blades. U.S. Pat. No. 6,438,866 similarly discloses a linear deflector blade in combination with the lifter blades with the linear deflector blade illustrated angularly oriented back from the attachment points as viewed in the direction of rotation of the rotor.

The lifter blades disclosed in U.S. Pat. No. 3,675,697 include two components one of which is essentially planar and perpendicular to the longitudinal or vertical axis of the rotor, and a second essentially triangular component attached to the planar component and pointed upwardly and angularly toward the planar component of blades in the next higher row. U.S. Pat. No. 6,505,416 essentially identifies four regions of lifter blades along the vertical height of the rotor. The initial or lowermost section of blades essentially form an auger style portion allowing sufficient open area for the pellet slurry introduced between these blades as it is delivered from the center of the rotor. The second more heavily populated portion of the rotor is in the dewatering section to provide additional impacts to insure that the pellets can be removed from the incoming fluid of the slurry and transported up and through the drying, or third, portion where the number of blades is significantly reduced. The uppermost or fourth portion has blades oriented parallel to the vertical axis of the rotor to deflect the significantly dried pellets out of and away from the dryer. The blades other than those in the fourth section are preferably involute in structure allowing for curvature of the outer blade edge upwardly and towards the rotor to deflect the pellets toward the underside of the next row of blades and reduce the impacts directly onto the screen as these are deemed detrimental to the quality of the pellets.

The housings of conventional dryers have been round, square, and hexagonal as disclosed in U.S. Pat. Nos. 5,987,769; 4,476,019; and 5,265,347 respectively. Similarly, many and various types of screens have been utilized, from hinged screens as disclosed in U.S. Pat. No. 5,265,347, to multilayer screens as disclosed in U.S. patent application Publication No. 20060130353. Deflectors or flow disrupters have also been disclosed for use on the screens such that banding of pellets about the screen can be avoided. These disclosures include U.S. Pat. No. 6,438,866 wherein angled attachments as well as angled blocks are incorporated at the juncture of the screen components. Deflector bars are attached directly to non-screen portions of the screen components as disclosed in U.S. Pat. No. 6,739,457. U.S. patent application Publication No. 2008/0289208 further discloses that the deflectors can be embossed into non-screen portions of the screen components. Various portions of the dryer can be treated with abrasion-resistant non-stick surface treatments as disclosed in World Patent Application Publication No. WO2009/059020.

Surprisingly, with all these variants and attempts at dryer systems, a reliable consistent throughput dryer remains elusive, particularly one that has high throughput and low moisture content without compromising facile cleaning, manually or automatically, of an agglomerate catcher and without over-powering the dewatering components of the dryer. Furthermore, little mention of the possible impact of lifter positioning and orientation has been discussed.

BRIEF SUMMARY OF THE INVENTION

Briefly described, in preferred form, the present invention is a dryer system, and a method of drying, with improved throughput comprising an agglomerate catcher, dewaterer (sometimes referred to herein as a "fluid removal section", a "solid-liquid separator" and/or a "fluid reduction section") and centrifugal dryer. It is understood that the term "dryer system" or "dryer" can include various "sections", wherein as used herein at times, the present invention comprises distinct elements of a catcher, dewaterer and dryer, as opposed to describing the invention as a dryer having a catcher section, a dewatering section, and a dryer section. It will be understood to those of skill in the art that there is no intended distinction when describing the present invention as a dryer system comprising distinct elements, or a dryer comprising various sections.

In a preferred embodiment of the present invention, a system for removing surface moisture from particulate is provided, the system comprising a plurality of lifting blades for moving the particulate through system, the particulate generally drying as it is moved through the system, a lifting blade having a trailing edge, a leading edge, an attached edge and an outside edge; wherein at least a portion of the lifting blades in proximity to a particulate feed to the system form at least one helical configuration; and wherein at least a portion of the lifting blades have a blade angle of less than 45° defined by the inclination of the trailing edge of a blade above that of a plane drawn horizontally through the leading edge of a blade.

At least a portion of the lifting blades may have a tilt angle of from −20° to +40° defined as the angle of a blade from the outside edge to that of a plane drawn through the attached edge.

In another preferred embodiment, a dryer system for removing surface moisture from particulate is provided, comprising a dryer comprising a rotor, the rotor comprising a plurality of lifting blades for lifting particulate through the system, the particulate generally drying as it is lifted through the system; wherein at least a portion of the lifting blades form at least one helical configuration.

The dryer system may comprise a centrifugal dryer.

The rotor may comprise at least two sections, a wet particulate feed section into which particulate enters the system, and a drying section located above the wet particulate feed section, wherein the number of lifting blades per a given length of the wet particulate feed section is less than the number of lifting blades per the same length of the drying section.

At least a portion of the lifting blades of the wet particulate feed section may form at least two helical configurations and have a blade angle of less than 45° defined by the inclination of the trailing edge of a blade above that of a plane drawn horizontally through the leading edge of a blade.

At least a portion of the lifting blades of the wet particulate feed section may form at least two helical configurations and have a blade angle of less than 45° defined by the inclination of the trailing edge of a blade above that of a plane drawn horizontally through the leading edge of a blade; and wherein at least a portion of the lifting blades of the wet particulate feed section are longer than at least a portion of the blades of the drying section.

At least a portion of the lifting blades may be removably attached to the rotor.

At least a portion of the lifting blades may have a tilt angle of from −20° to +40° defined as the angle of a blade from the outside edge to that of a plane drawn through the attached edge.

Alternative embodiments provide a dryer system for removing surface moisture from particulate, the dryer system comprising a centrifugal dryer having a particulate lifting cylindrical rotor assembly positioned within a foraminous membrane, the cylindrical rotor assembly comprising a cylindrical rotor assembly having a plurality of lifting blades for lifting the particulate through sections of the centrifugal dryer, the particulate generally drying as it is lifted through each section; wherein the cylindrical rotor assembly of the centrifugal dryer comprises at least two sections, a wet particulate feed section into which the particulate enters the centrifugal dryer, and a drying section located above the wet particulate feed section, wherein the number of lifting blades per a given length of the wet particulate feed section is less than the number of lifting blades per the same length of the drying section.

At least a portion of the lifting blades of the wet particulate feed section may form at least one helical configuration.

At least a portion of the lifting blades of the wet particulate feed section may form at least two helical configurations, and have a blade angle of less than 45°.

At least a portion of the lifting blades of the wet particulate feed section may form at least two helical configurations, have a blade angle of less than 45°, and are longer than the blades of the drying section.

At least a portion of the lifting blades may be removably attached to the cylindrical rotor assembly.

At least a portion of the lifting blades may have a tilt angle of from −20° to +40° defined as the angle of a blade from the outside edge to that of a plane drawn through the attached edge.

To facilitate deflection of particulate off the foraminous membrane, embossed raised profiles may be provided into non-perforate areas of the foraminous membrane such that a raised area is introduced on an inner surface of that foraminous membrane.

To facilitate deflection of particulate off the foraminous membrane, deflector bars may be attached to non-perforate portions of the foraminous membrane.

To facilitate deflection of particulate off the foraminous membrane, an assemblage of releasably attached angled deflector components may be attached to non-perforate portions of the foraminous membrane. The assemblage may be attached via a bolt and nut connection.

To facilitate deflection of particulate off the foraminous membrane, an angled deflector component may be weldingly attached to a terminus of a first foraminous membrane and may be removably attached boltingly to a complementarily angled deflector component attached to another terminus of a second foraminous membrane such that the two termini may be boltingly connected with the angle portions pointing symmetrically into an inner area of the first and second foraminous membranes.

The rotor may have a bottom and a top, wherein the rotor is drivingly connected to a motor located in proximity of the bottom of the rotor.

The rotor may have a bottom and a top, wherein the rotor is drivingly connected to a motor located in proximity of the top of the rotor.

Other exemplary embodiments, a dryer system for removing surface moisture from particulate in the form of a slurry of particulate and fluid is provided, the dryer system comprising: a dewaterer having at least one deflection device within a foraminous membrane, and a dewatered particulate discharge chute, the dewaterer removing bulk fluid from the slurry of particulate and fluid; and a dryer for drying moisture from the particulate; wherein the dewatered particulate discharge chute of the dewaterer comprises a cylindrical foraminous dewatered particulate discharge chute.

The angle of inclination between the foraminous membrane and the discharge chute may be less than 90°.

The at least one deflection device of the dewaterer may comprise a downwardly and outwardly tapering frustoconical device.

The downwardly and outwardly tapering frustoconical device of the deflection device of the dewaterer may include a spirally tapering fin.

The foraminous membrane of the dewaterer may comprise a frustoconical foraminous membrane.

The dryer may be a centrifugal dryer and comprises a cylindrical rotor assembly, the cylindrical rotor assembly comprising at least two sections, a wet particulate feed section into which the particulate from the dewatered particulate discharge chute enters the centrifugal dryer, and a drying section located above the wet particulate feed section; wherein lifting the dewatered particulate through sections of the centrifugal dryer comprises using lifting blades; and wherein the number of lifting blades per a given length of the wet particulate feed section is less than the number of lifting blades per the same length of the drying section.

The dryer system may further comprise an agglomerate catcher having an agglomerate removal grid, the agglomerate catcher removing particulate agglomerates from the slurry of particulates and fluid.

The agglomerate removal grid may have an angle of inclination of greater than 50°.

The agglomerate catcher may have an overflow opening through which collected agglomerated particulate can enter the agglomerate overflow housing, the overflow opening having open and closure means comprising a gate.

The dryer system may further comprise a pelletizer, the pelletizer forming particulate in the form of pellets.

Other exemplary embodiments provide a system for removing surface moisture from particulate in the form of a slurry of particulate and fluid, the system comprising an agglomerate catcher for catching particulate agglomerates from the slurry of particulate and fluid; a plurality of lifting blades for moving the particulate through system, the particulate generally drying as it is moved through the system, a lifting blade having a trailing edge, a leading edge, an attached edge and an outside edge; wherein at least a portion of the lifting blades in proximity to a particulate feed to the system form at least one helical configuration; and wherein at least a portion of the lifting blades have a blade angle of less than 45° defined by the inclination of the trailing edge of a blade above that of a plane drawn horizontally through the leading edge of a blade.

The agglomerate catcher may comprise an agglomerate removal grid that permits passage therethrough of the slurry of particulate and fluid, but collects agglomerated particulate of a size greater than the grid permits.

The system may further comprise a dewaterer having at least one deflection device within a foraminous membrane, and a dewatered particulate discharge chute, the dewaterer removing bulk fluid from the slurry of particulate and fluid; and a centrifugal dryer having a particulate lifting rotor positioned within a screen, the rotor comprising a plurality of lifting blades, for lifting the particulate through sections of the centrifugal dryer, the particulate generally drying as it is lifted through each section; wherein the rotor of the centrifugal dryer comprises at least two sections, a wet particulate feed section into which the particulate from the dewatered particulate discharge chute enters the centrifugal dryer, and a drying section located above the wet particulate feed section, wherein the number of lifting blades per a given length of the wet particulate feed section is less than the number of lifting blades per the same length of the drying section.

At least a portion of the lifting blades may have a tilt angle of from −20° to +40° defined as the angle of a blade from the outside edge to that of a plane drawn through the attached edge.

These and other objects, features, and advantages of the present invention will become more apparent upon reading the following specification in conjunction with the accompanying drawing figures.

BRIEF DESCRIPTION OF THE DRAWINGS

FIG. 6 is a top view illustration of the agglomerate catcher assembly showing the agglomerate catcher grid and the plate and handles for use in its removal and insertion.

FIG. 30a is an illustration of a removable deflector attached to a foraminous membrane.

FIG. 30b is a cross-sectional illustration of the removable deflector attached to a foraminous membrane in FIG. 30a.

FIG. 32 is an expanded view of the deflector assemblies in FIG. 31.

DETAILED DESCRIPTION OF THE INVENTION

Figure 1A:
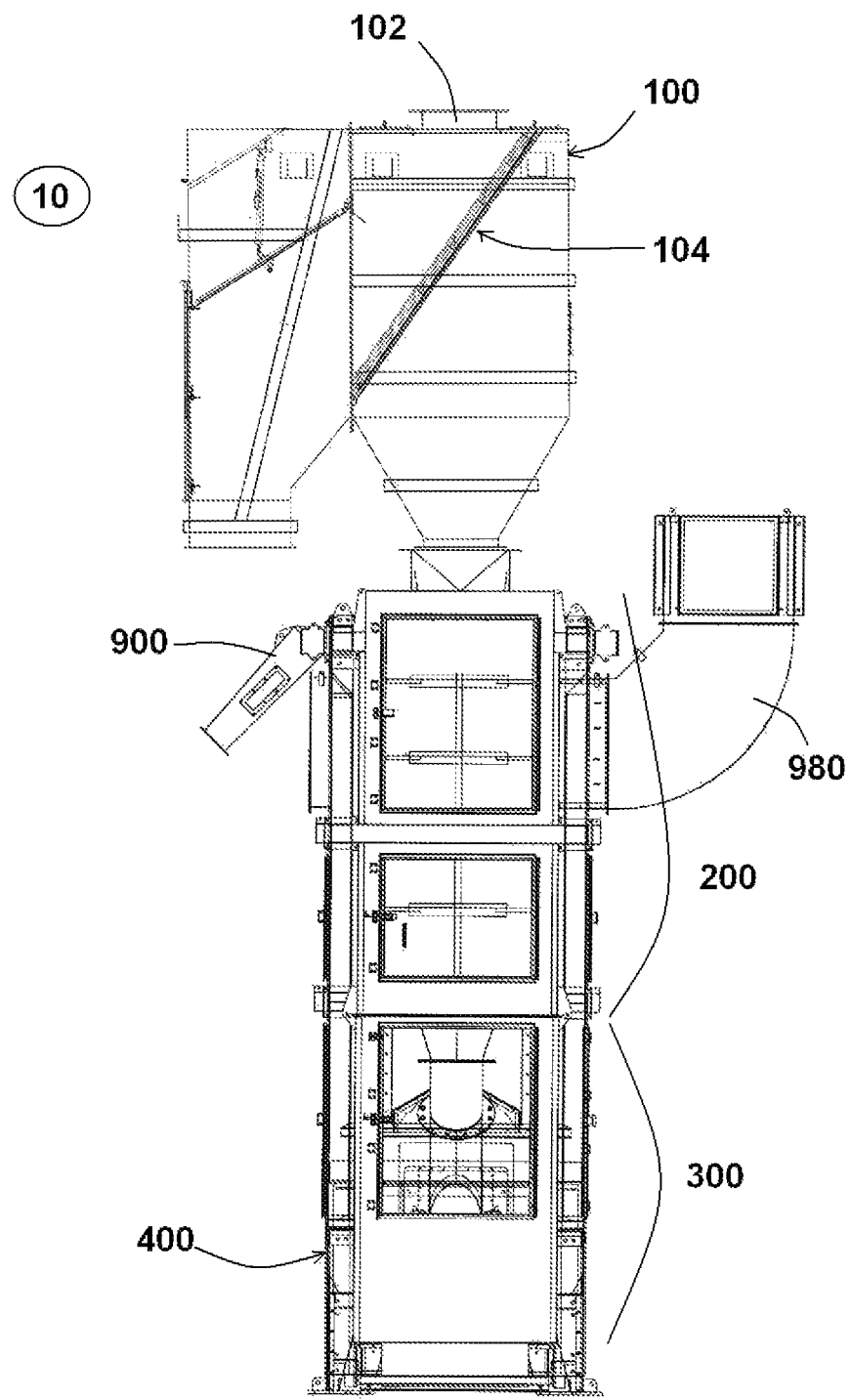
FIG. 1a illustrates a dryer assembly including an agglomerate catcher oriented toward the pellet outlet chute, a dewatering section, a feed section and a blower conduit attached to the dryer section assembly.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise. For example, reference to a pellet or lifter is intended also to include the processing of a plurality of pellets or lifters. References to a composition or fluid containing "an" ingredient or "a" constituent is intended to include other ingredients or other constituents, respectively, in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose. As just a few examples, the terms "pellet", "water", "pellet slurry", "foraminous membrane", and "rod" are discussed below.

For example, the term "pellet" can include, and be interchangeable with, micropellets or particulates. Such pellets/micropellets/particulates can be of many shapes, and is typified by regular or irregular shaped discrete particles without limitation on their dimensions, including flake, stars, spheres, conventional pellets, chopped fibers, and other shapes. They also can be round, square, rectangular, triangular, pentagonal, hexagonal or otherwise geometric in cross-section, star-shaped or other decorative designs, and can be the same or different when viewed in a second cross-section perpendicularly to the first. Preferably, the pellets are spherical to lenticular for the major or preponderant rotational component.

For example, the term "water" includes not only water itself, but also water with one or more additives included, which are added to the water.

For example, the term "pellet slurry" includes pellets/micropellets/particulates in a fluid, which can include a water (with one or more additives included) or other transportation fluids with one or more additives included useful for drying systems of the present invention.

For example, the term "foraminous membrane" includes a material having apertures distributed therein. Materials used in the formation of the foraminous membrane will be understood by those of skill of the art to be selected to provide the desired physical properties such as weight, rigidity and the like, and are also selected to provide the desired chemical properties. The apertures can vary in number and placement, and can include various shapes, including round, oval, square, rectangular, triangular, polygonal, and others. The "foraminous membrane" can include a grid, perforated plate or screen that permits passage of pellets therethrough, wherein at least some fluid exits through the foraminous membrane, with perhaps small fines or other small-sized material escapable through the apertures.

For example, the terms "bar", "rod" or similar terms can include forms of many geometries, including round, square, and rectangular, and can be hollow or solid.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1B:
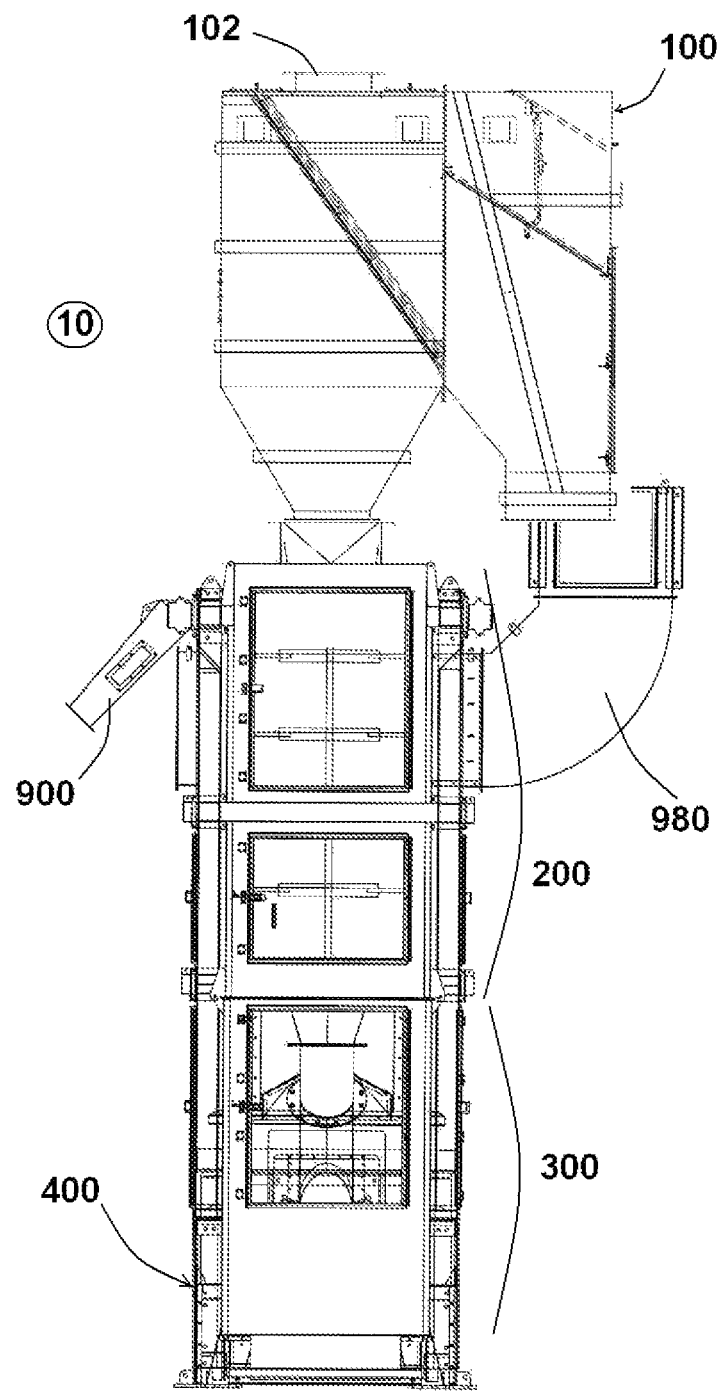
FIG. 1b illustrates a dryer assembly including an agglomerate catcher oriented toward and partially obscuring the blower conduit, a pellet outlet chute, a dewatering section, and a feed section attached to the dryer section assembly.

Referring to the drawings, FIGS. 1a and 1b illustrate a preferred embodiment of dryer assembly 10 comprising an agglomerate catcher 100, dewatering unit 200 with feed chute 300, and centrifugal dryer 400. The dryer system 10 can comprise the agglomerate catcher assembly 100 attached to the fluid reduction section assembly 200 and feed chute assembly 300 through which defluidized material is introduced to the dryer section assembly 400 to which is attached outlet chute 900 and blower duct 980. FIGS. 1a and 1b differ in illustration of alternate orientations of the agglomerate catcher assembly 100 in relation to dryer section assembly 400. In FIG. 1b a portion of the agglomerate catcher assembly 100 is in front of and partially obscures the blower 980 as illustrated.

The basic sequence of the drying process as it relates to FIG. 1a follows introduction of a pellet slurry from upstream processes through inlet 102 of agglomerate catcher assembly 100, wherein the slurry passes through an agglomerate removal grid 104 allowing the deagglomerated pellet slurry to pass through and subsequently into the fluid reduction section assembly 200, wherein the pellet-to-fluid ratio is increased, effectively concentrating the slurry. This concentrated pellet slurry continues into and through the feed chute assembly 300, wherein further fluid reduction is achieved, and the slurry then introduced into the lower portion of the dryer section assembly 400. The pellets are significantly reduced in fluid content as they move upwardly and out of the dryer section assembly 400 through outlet chute 900 and subsequent transport, storage, and/or post-processing as necessitated by the specific process.

Figure 2:
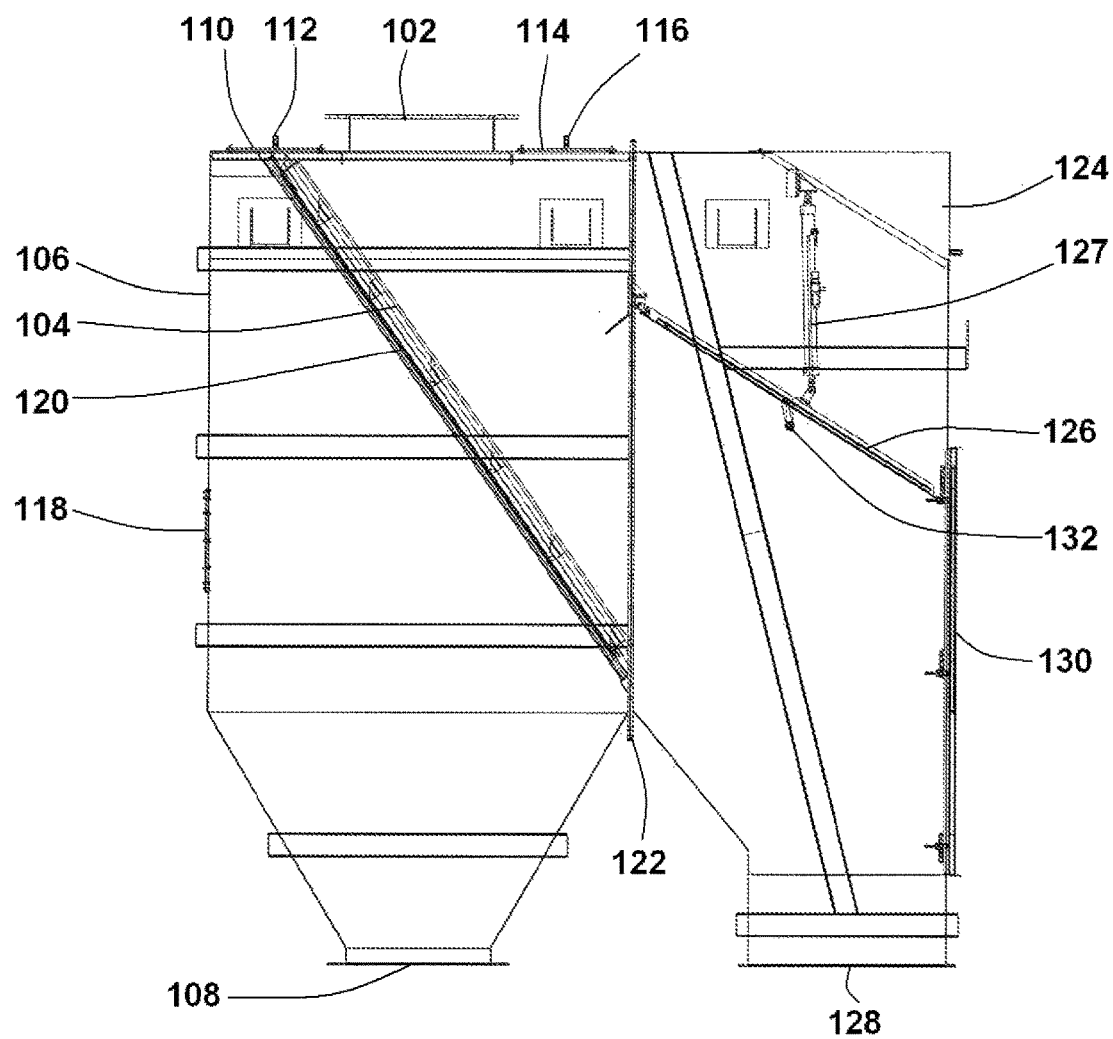
FIG. 2 illustrates a side view of an agglomerate catcher assembly through the housing to show the position of the high angle agglomerate grid and the gate in the open position.

In a preferred embodiment of the instant invention as illustrated in FIG. 2, the agglomerate catcher assembly 100 comprises inlet 102 attachedly connected to the top of housing 106 through which the pellet slurry is introduced across the agglomerate removal grid 104. Housing 106 can be many geometries, including round or square, and is preferably rectangular in shape in the portion enclosing the agglomerate removal grid 104, tapering inwardly and downwardly to outlet 108. Removably and preferably hingedly attached to the top of the housing 106 is agglomerate grid removal door 110 with handle 112 through which the agglomerate removal grid 104 can be removed. Optional access door 114 with handle 116 also can be removably and/or hingedly attached to the top of housing 106. Similarly, optional viewing port 118 can be fixedly attached to housing 106, the location of which is shown by way of illustration but is not limited to the location shown.

Agglomerate removal grid 104 is inserted into and through agglomerate grid removal door 110 into a pair of grooved tracks 120 fixedly and angularly attached to the sides of housing 106 from the entry of the agglomerate grid removal door 110 to, but not through, the juncture 122 of housing 106 and agglomerate overflow housing 124 attachably, preferably boltingly, attached thereto. The wall formed by juncture 122 has an overflow opening (not shown in FIG. 2) through which the agglomerates can be removed. This overflow opening can be sealingly closed, manually or automatically, by gate 126 fixedly and hingedly attached across the uppermost edge of the overflow opening. A control cylinder 127 is attached to gate 126 and agglomerate overflow housing 124. Automatic closure, hydraulically and preferably pneumatically, of gate 126 is preferential and can be done by switch or by programmable logic control ("PLC"). Optionally, the opening and closing of gate 126 can be operated and controlled at fixed time intervals as maintained by PLC.

Agglomerate overflow housing 124 can be many geometries, including square or round, and is preferably rectangular with the lower portion tapering downwardly and inwardly toward agglomerate overflow outlet 128. Access port 130 is attachedly, preferably hingedly, connected to agglomerate overflow housing 124 to facilitate ease of access to the region of the overflow opening in juncture 122 and the lower portion of the agglomerate removal grid 104. Attached to and passing through agglomerate overflow housing 124 is a pair of manual safety rods with hand cranks 132 (only one visible) that when manually rotated threadingly move a cylindrical rod into the housing such that when the gate 126 is open, the manual safety rods with hand cranks 132 adjust the cylindrical rod into position beneath the gate 126 to prevent accidental or premature closure.

Figure 3:
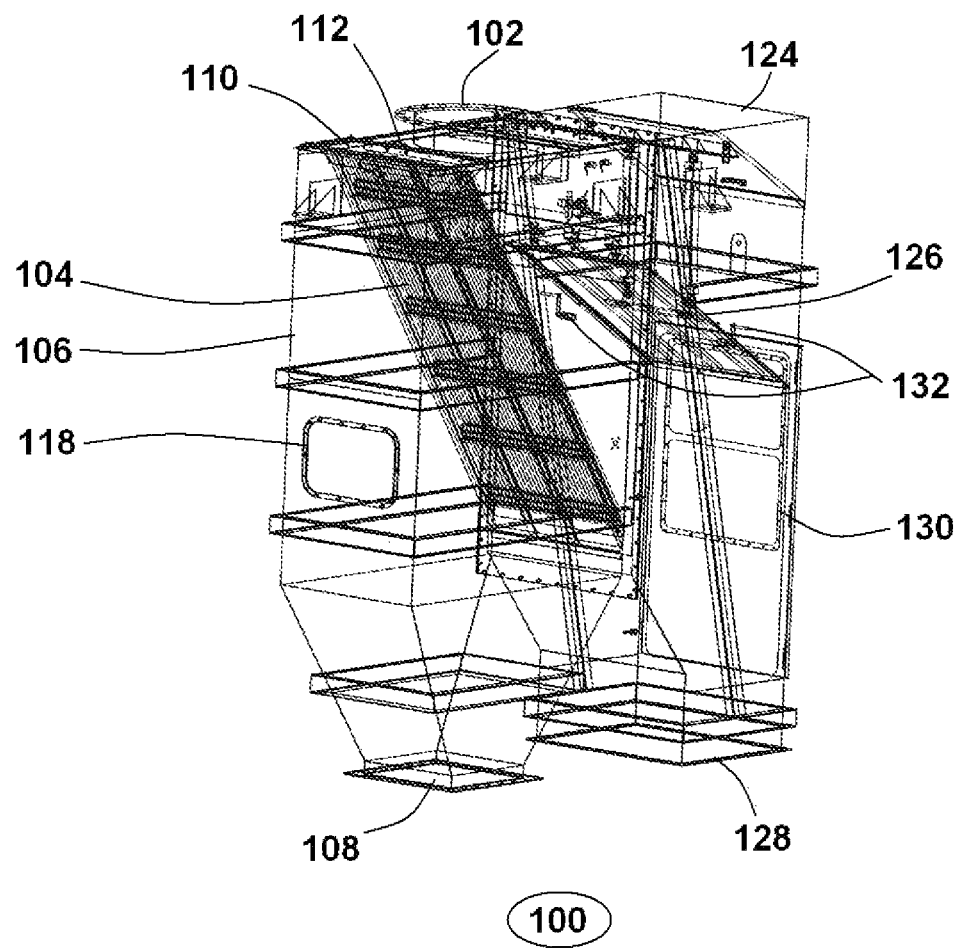
FIG. 3 is an angled perspective illustration of an agglomerate catcher assembly through the housing to show the position of the high angle agglomerate grid and the gate in the open position.
Figure 4:
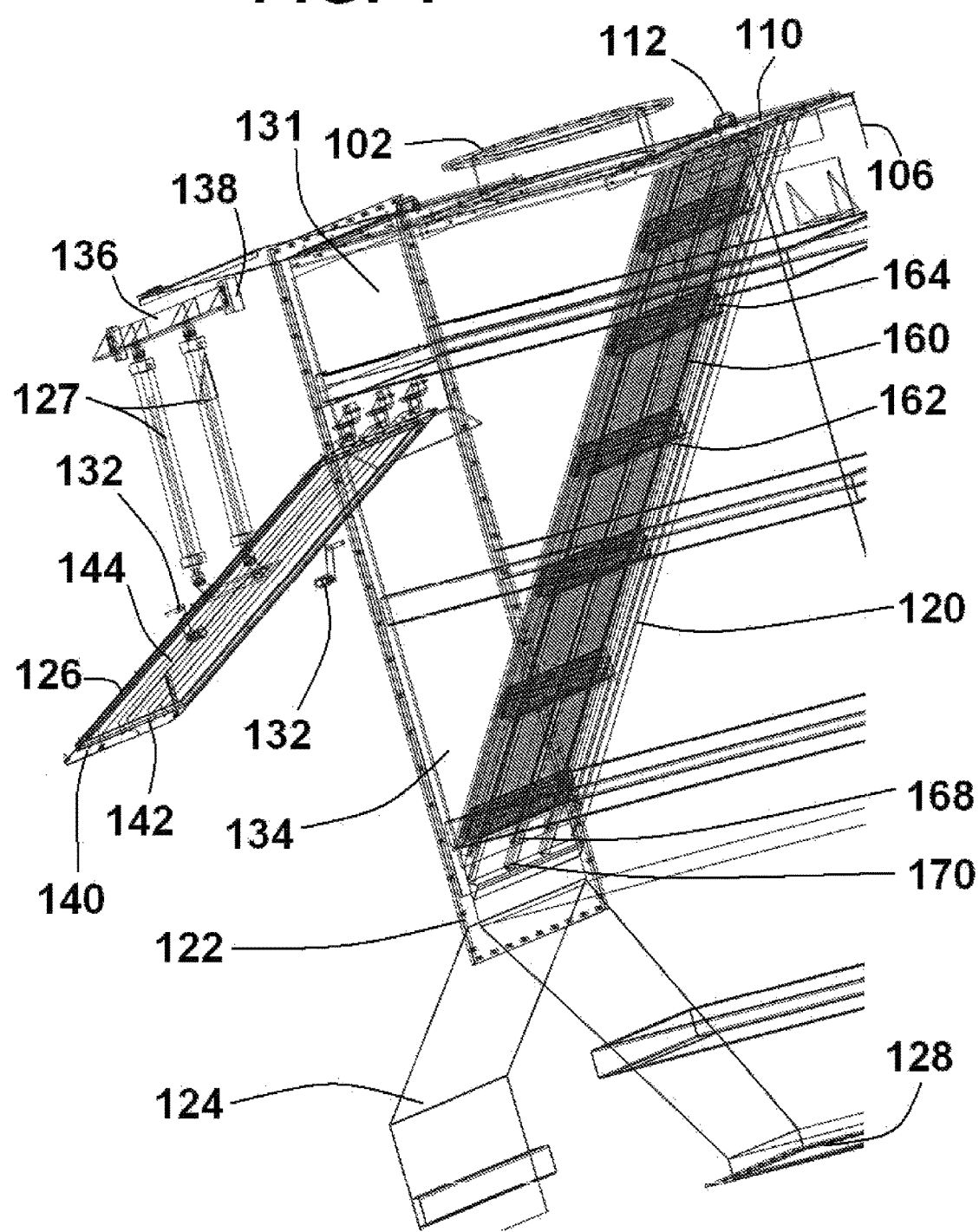
FIG. 4 is an expanded view of the angle perspective illustration of the agglomerate catcher assembly in FIG. 3.

FIG. 3 better illustrates a preferred embodiment of the agglomerate catcher assembly 100 three-dimensionally, wherein like numbers reflect like components in FIG. 2. FIG. 4, similarly numbered, orients a portion of agglomerate catcher assembly 100 such that an overflow opening 134 through juncture 122 is more clearly illustrated. A mounting bracket 136 for control cylinder 127 attaches to vertical support 138 (only partially illustrated as configured) and is subsequently attached, preferably by welding, to agglomerate overflow housing 124.

Figure 4A:
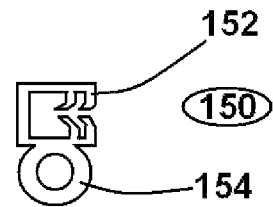
FIG. 4a is a cross-sectional illustration of the gasket material for use on the gate in the agglomerate catcher assembly.

Gate 126 comprises a metal plate 140 reinforced by rectangular frame 142 and a multiplicity of longitudinal braces 144. The edge of the metal plate 140 is fitted circumferentially with gasket material, preferably silicone, that is held in place by a suitable clasp. A preferred gasket 150 as illustrated in cross-section in FIG. 4a has a slotted portion 152 that fits securely over the metal plate 140 as well as a compressible cylindrically hollow portion 154 that sealingly fits between the metal plate 140 and the wall formed by juncture 122. Without intending to be limited, other suitable gasket materials and gasket configurations as are known to those skilled in the art can be utilized to achieve comparable results.

Figure 4B:
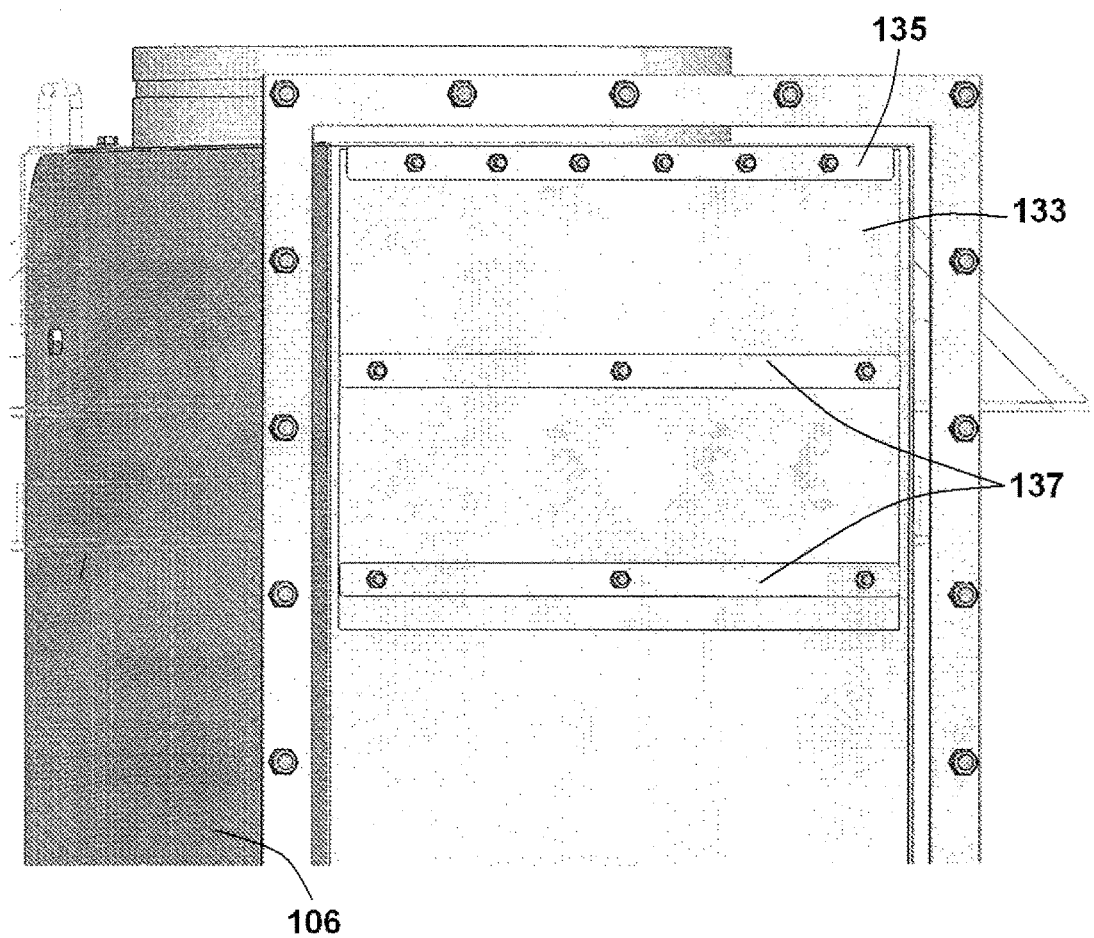
FIG. 4b is an expanded illustration of the flexible flap attached to the air-flow equilibration opening on the housing of the agglomerate catcher assembly.

Returning to FIG. 4, further illustrated is air-flow equilibration opening 131 that optionally can be covered with flexible flap 133 (FIG. 4b), the uppermost edge 135 of which is attachedly connected to, and preferably boltingly connected to, housing 106. Flexible flap 133 can be of many flexible materials, preferably polymeric, and more preferably is polypropylene. The flexible flap 133 completely covers air-flow equilibration opening 131 (not shown in FIG. 4b) and overlaps housing 106 sufficiently to prevent its being drawn backwardly through the opening into the interior of the housing 106. One or more optional weighting supports 137 can be attachedly connected horizontally across the face of the flexible flap. The weighting supports 137 preferably comprise a bar boltingly connected through the flexible flap to a second, similar underside bar (not shown) that differs only in the length, such that the bar on the underside does not contact housing 106, and thus is narrower than the width of the flexible flap 133 by at least the dimensions of the overlap of the flexible flap 133 on housing 106 at both ends of the underside bar. The weighting supports can be made of many materials and preferably are the same composition as is housing 106. This flexible flap 133 is capable of freely opening and closing, allowing equilibration of pressure as is dependent on the air flow drawn throughout the entire assembly. This prevents excessive air from being drawn into the process uncontrollably.

Figure 5A:
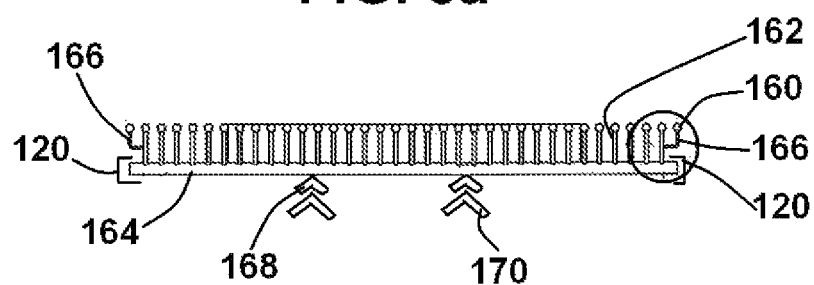
FIG. 5a is a cross-sectional illustration of the agglomerate catcher grid.
Figure 5B:
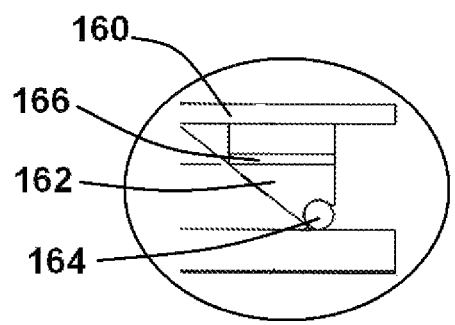
FIG. 5b is an expanded view illustration of the support assembly for the agglomerate catcher grid.
Figure 5C:
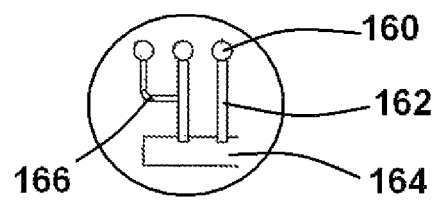
FIG. 5c is an expanded view cross-sectional illustration of a portion of the agglomerate catcher grid.

As shown in FIG. 4 and detailed in FIGS. 5a, 5b, and 5c, the agglomerate removal grid 104 comprises a multiplicity of longitudinal rods 160 weldingly attached to a multiplicity of triangular supports 162 that are in turn weldingly attached to horizontal rods 164 that slide into and along grooved tracks 120. To accommodate space for the horizontal rods 164 to slide unobstructedly along grooved tracks 120, the outermost longitudinal rods 160 are weldingly attached to angle bracket 166 that subsequently is welded to the side of the adjacent triangular support 162. As the size of the dryer assembly increases, additional support beneath the similarly-increasing agglomerate removal grid 104 can become important. To facilitate this strengthening, a multiplicity of support rods 170, (FIG. 4 and detailed in FIG. 5a), are welded to the top of housing 106 between the pair of grooved tracks 120 as well as to the wall formed as juncture 122. Additionally, support rods 168 are weldingly attached to the multiplicity of horizontal rods 164. To facilitate movement of the support rods 168 along support rods 170, it is preferential that they be inverted v-angle supports as illustrated in cross-section in FIG. 5a. Thus the v-portion of support rod 168 slides without inhibition along a geometrically cooperating v-portion of support rod 170.

To better facilitate removal of the agglomerate removal grid 104 through agglomerate removal door 100, (FIGS. 2, 3, and 4), the uppermost edge of the agglomerate removal grid 104 can be attached, preferably weldingly, to the underside of the agglomerate removal door. More preferably, as illustrated in FIG. 6, a plate 172 can be weldingly attached to the upper ends of support rods 168 on agglomerate removal grid 104. To this plate 172 are attachedly connected at least one handle 174 that can be manually grasped or attached to an appropriate lifting device, such as a crane, for example, to be removed from the agglomerated catcher assembly 100.

Figure 7:
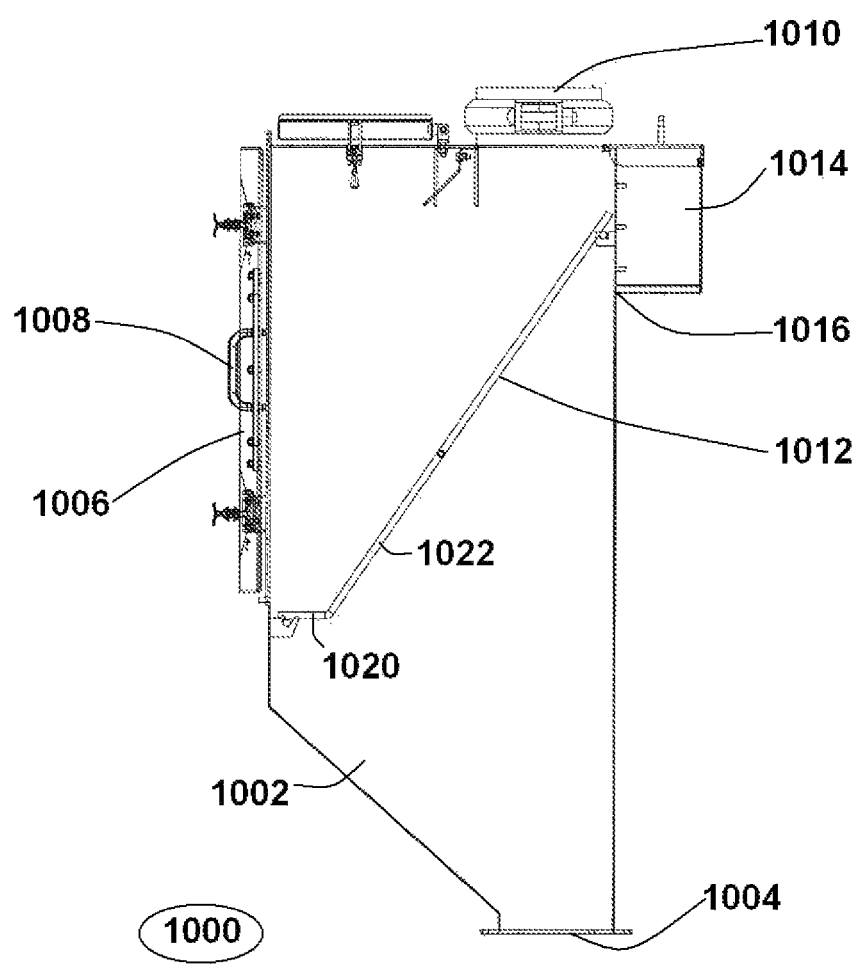
FIG. 7 is an illustration of an alternative agglomerate catcher assembly configuration with an overflow attachment.

In another preferred embodiment of the present invention, FIG. 7 illustrates an overflow agglomerate catcher assembly 1000 comprising a housing 1002 that can be many geometric configurations, including round or square, but preferably rectangular in shape, and tapers downwardly and inwardly to outlet 1004. Hingedly attached to the front of housing 1002 is access door 1006 with handle 1008. The door can be hinged at the side or at the top as space and ease of access allows. The pellet slurry enters through inlet 1010 as described above and passes over agglomerate removal grid 1012. Attached, preferably by bolting, to the back of housing 1002 and covering an overflow opening, not shown, is overflow housing 1014. The overflow opening can optionally be covered by a foraminous membrane device as described in detail hereinbelow. The foraminous membrane device can be removably attached at the juncture 1016 between the housing 1002 and the overflow housing 1014 as by bolting or insertion into a slotted groove for ease of removal to clean. Alternatively, the screening device can be fixedly attached, as by welding, to the juncture 1016. This embodiment is preferable for materials prone to high levels of agglomeration formation, particularly sticky or tacky materials, such that build-up of agglomerates can be tolerated, wherein the flow of the pellet slurry is not obstructed by the build-up. The choice of the screening device is of particular importance to minimize clogging during an overflow situation. This embodiment is further preferable for low fluid temperature processing and manual operations where risk of burn or injury to the operator is minimal.

Figure 8:
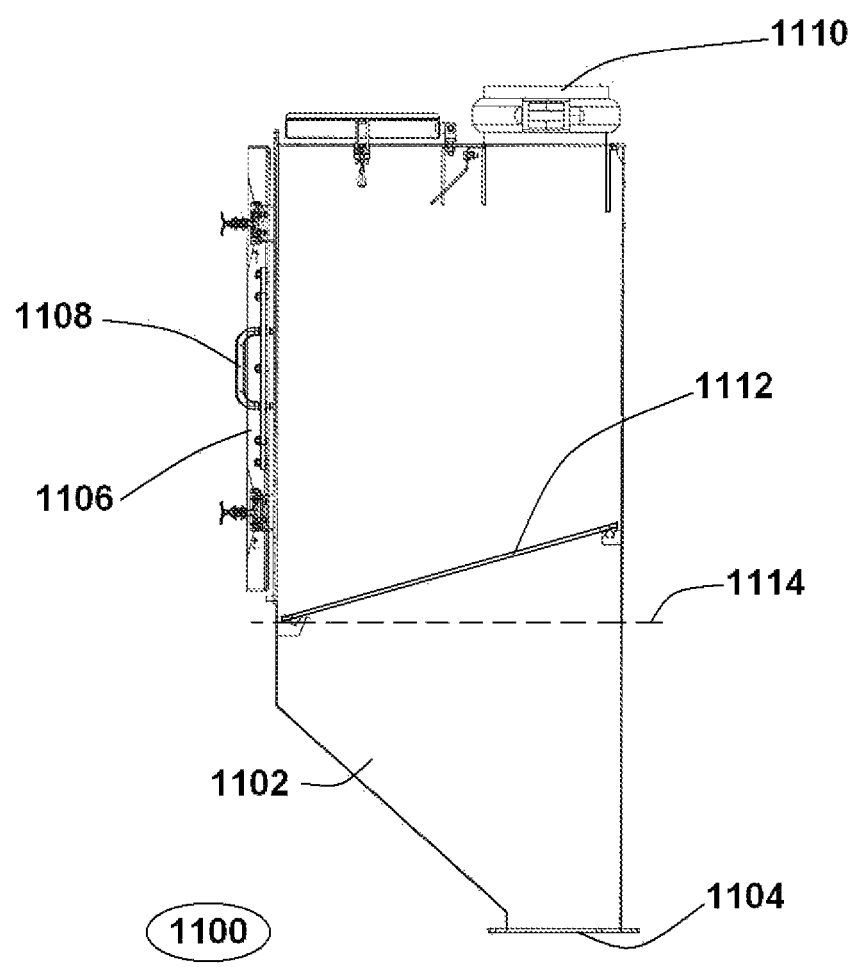
FIG. 8 is an illustration of an alternative agglomerated catcher assembly configuration showing a low angle manually operated configuration.

FIG. 8 illustrates another preferred embodiment, providing a relatively simple manual and low-temperature embodiment of an agglomerate catcher assembly 1100, wherein there is no overflow housing and the agglomerate removal grid 1112 is at a considerably lower angle of inclination than of other disclosed embodiments. As illustrated, the manual agglomerate catcher assembly 1100 comprises a housing 1102 that can be many geometries, including round or square, but is preferably rectangular tapering downwardly and inwardly toward outlet 1104. Hingedly attached to the front of housing 1102 is access door 1106 with handle 1108 that can be hinged from the side or the top as space and configuration allow. As before, the pellet slurry is introduced through inlet 1110 and passes across agglomerate removal grid 1112 at a lower angle of inclination.

The agglomerate removal grids 104 (FIG. 2), 1012 (FIGS. 7), and 1112 (FIG. 8) can be at many angles of inclination 1116 ranging from 0 degrees to greater than 50 degrees as measured from a horizontal plane that transects the lowest point of the agglomerate removal grid as indicated by the dotted line 1114 in FIG. 8. Preferably the angle of inclination 1116 ranges from approximately 20 degrees to greater than 50 degrees, more preferably from approximately 40 degrees to greater than 50 degrees and most preferably greater than 50 degrees. The lower angle of inclination (for example, 0 degrees to 20 degrees for grid 1112 of FIG. 8) is particularly useful for manual low fluid temperature processes to allow ease of removal from accumulating agglomerates. As the process moves from manual to automatic operation, the angle of inclination is favorably raised to minimize the need for operator activity. Thus, in high volume processes and/or high temperature processes, an angle of inclination greater than 50 degrees is most preferable to allow the accumulation of agglomerates to purge itself upon opening of the gate 126, as exemplified in FIG. 2, without need of assistance from an operator. The subsequent release of the agglomerates into the agglomerate overflow housing 124 and through the outlet 128 allows remote collection and/or transport of the accumulated agglomerates away from the area of operation. Subsequently, outlet 128 can be connected to a waste bin, a recycle bin, or other storage and transport mechanisms known to those skilled in the art.

Figure 9:
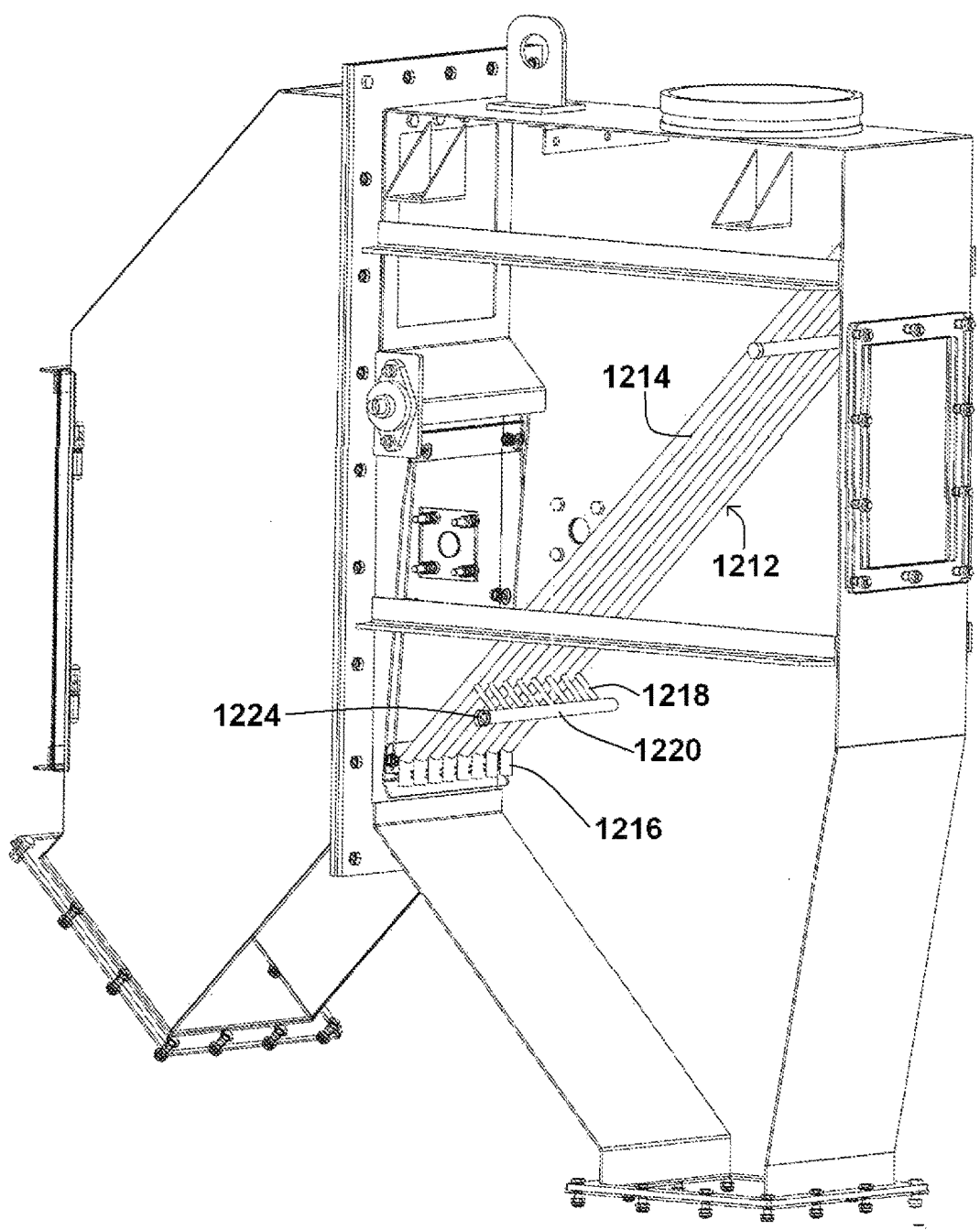
FIG. 9 is an angled perspective illustration of an alternative configuration for the agglomerate catcher grid.
Figure 10:
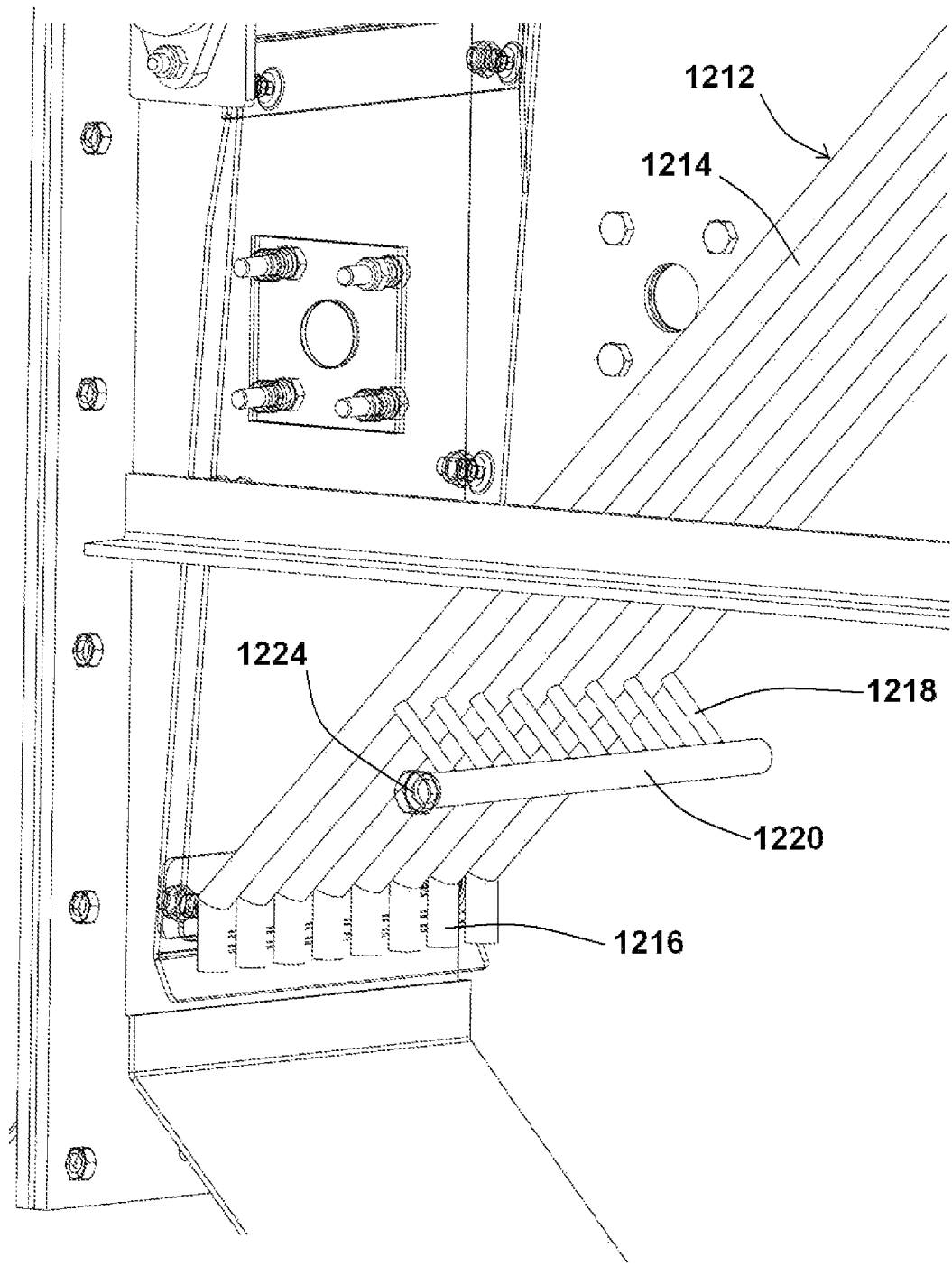
FIG. 10 is an expanded view of the angled perspective illustration of the alternative configuration agglomerate catcher grid in FIG. 9.
Figure 11:
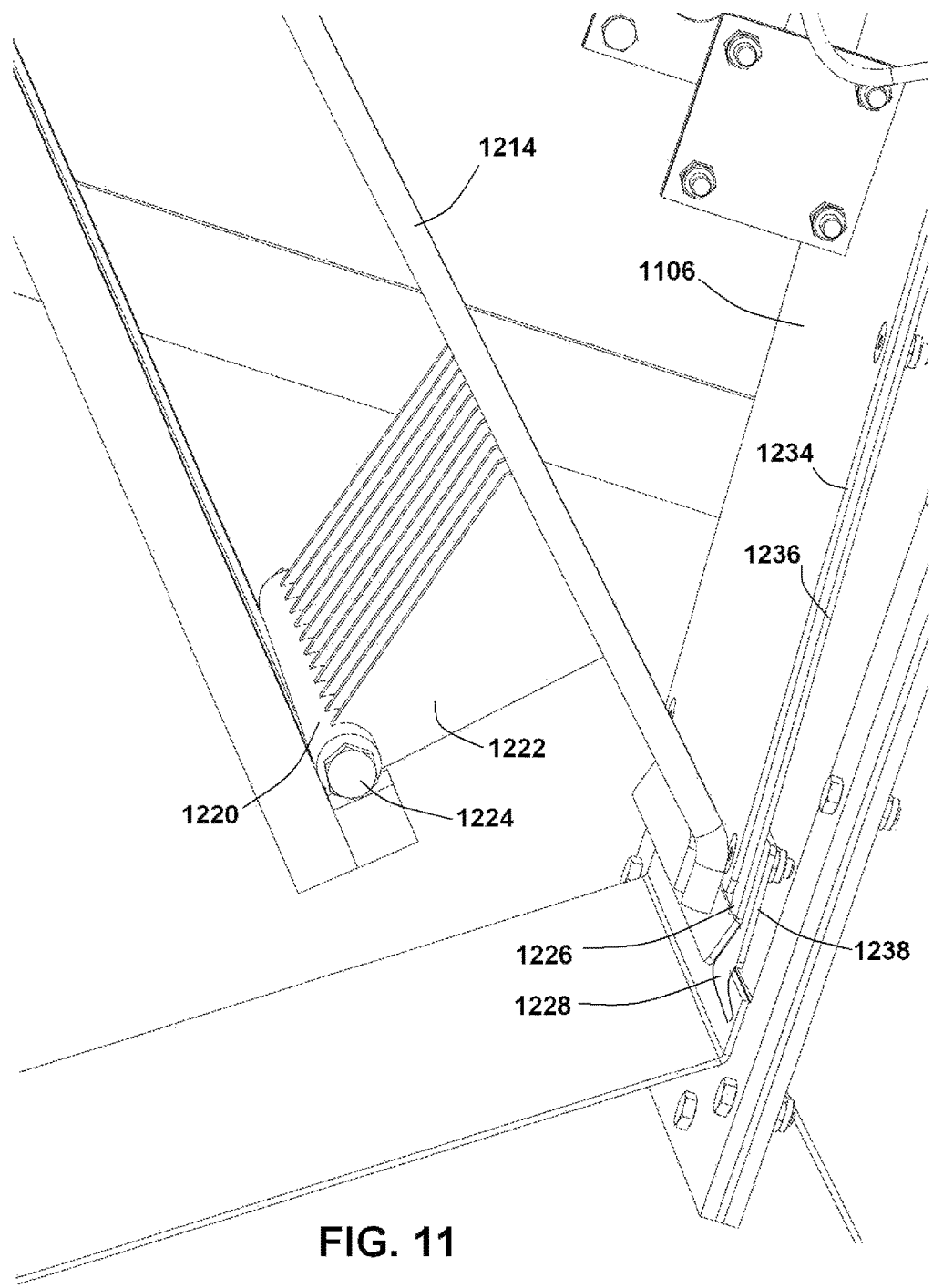
FIG. 11 is an expanded view angled perspective illustration of another alternative configuration for an agglomerate catcher grid support.
Figure 12:
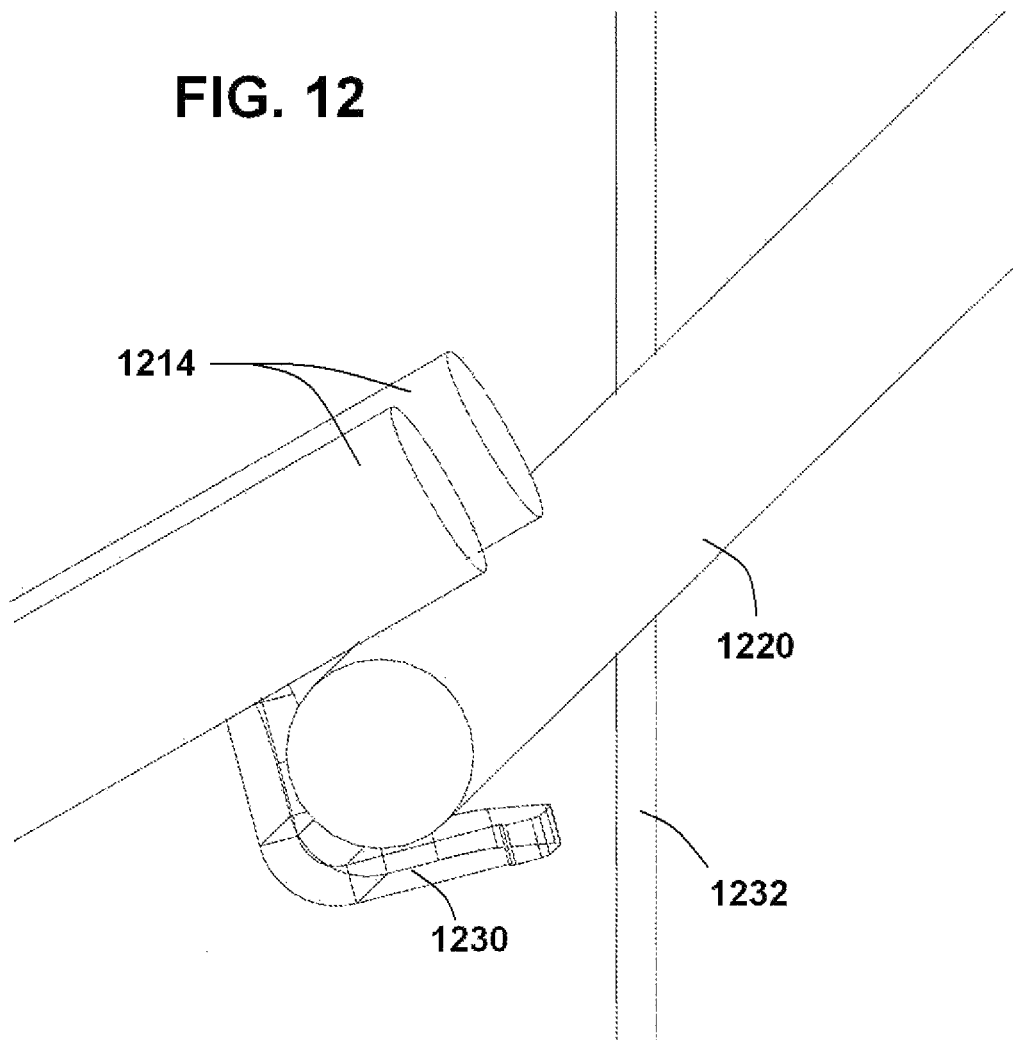
FIG. 12 is an expanded view angled perspective illustration of a removal agglomerated catcher grid support.

Alternative agglomerate catcher assemblies are contemplated. FIG. 7 illustrates an agglomerate removal grid 1012 that has flat area at its lowest portion formed by welding horizontal rod component 1020 to vertical rod components 1022. This allows for accumulation of a larger quantity of agglomerates as can be common in sticky and tacky formulations. FIGS. 9 and 10 illustrate an alternative agglomerate removal grid 1212 design wherein the lowermost ends of the longitudinal rods 1214 are bent or preferably welded in a downwardly turned angle to form vertical component 1216. The longitudinal rods 1214 can be weldingly attached to a multiplicity of support rods 1218 (FIGS. 9 and 10) or to a triangular bracket 1222 (FIG. 11) that are similarly welded to horizontal rods 1220 (FIGS. 9, 10, and 11). The agglomerate removal grid 1212 can be fixedly attached to the housing (shown as transparent for illustration purposes) by welding, and preferably are removably attached by threadingly inserting bolts 1224 into the complementarily threaded ends of the multiplicity of horizontal rods 1220 (FIGS. 9, 10, and 11). FIG. 12 illustrates a simple attachment method wherein an L-angle 1230 is welded onto the wall of the housing (shown as transparent for illustration purposes) near the juncture of two walls of that housing 1232, for example. Into this L-angle is placed the horizontal rod 1220 to which is weldingly attached a multiplicity of longitudinal rods 1214 to form an agglomerate removal grid that manually can be inserted or removed from the agglomerate catcher assembly. FIG. 12 is illustrative of an assembly useful in small volume, low fluid temperature operations or where large quantities of agglomerates are not anticipated.

FIG. 11 further illustrates an alternative configuration for the gasket in which a rectangular gasket 1226 provides insulation between panel 1234 and angled panel 1236 of access door 1106. Overlap gasket 1228 is positioned between angled plate 1236 and backplate 1238 with the excess material extending past the edges of both plates to form a sealing flap. The gasket material can be of many suitable materials including neoprene and silicone, and is preferably ethylene propylene diolefin monomer copolymer ("EPDM"). The assemblage is boltingly connected.

Figure 13:
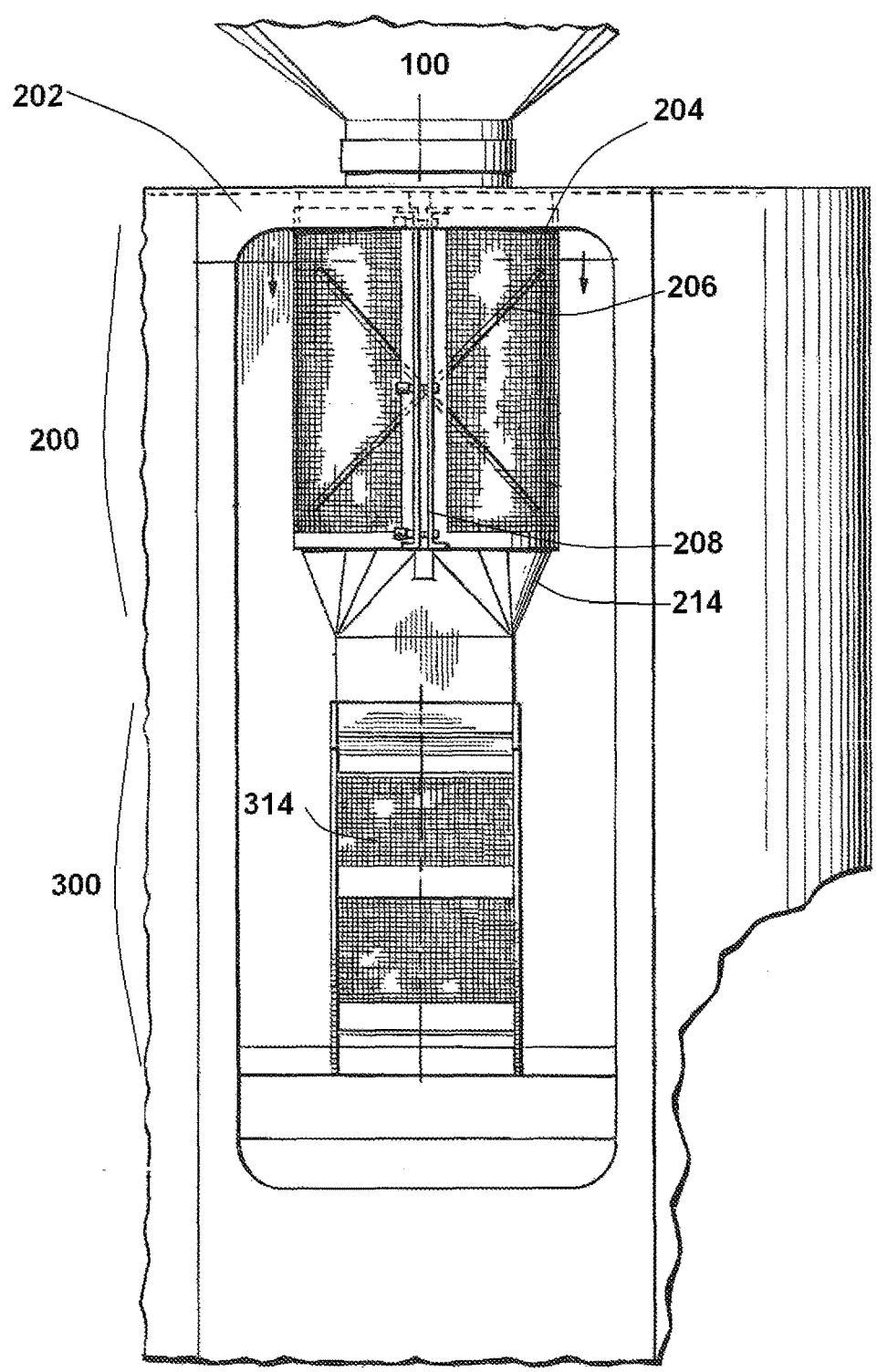
FIG. 13 is an illustration of a prior art dewatering section and feed chute section.
Figure 14:
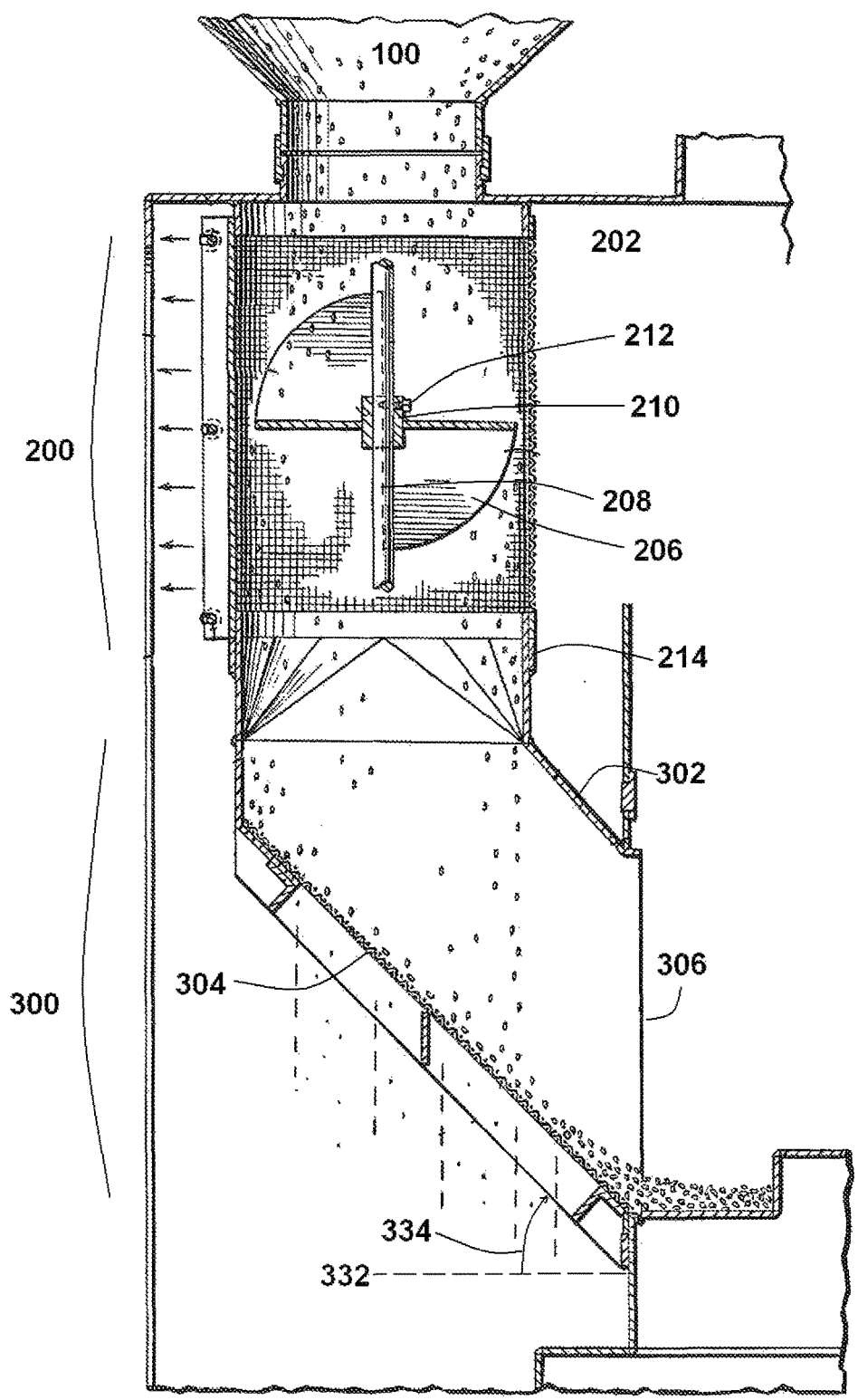
FIG. 14 is a side view illustration of the prior art dewatering section and feed chute section in FIG. 13.

FIGS. 13 and 14 illustrate a prior art fluid reduction section assembly 200 and feed chute assembly 300 to which is attached agglomerate catcher assembly 100. Within the housing 202 is at least one vertical cylindrical screen member or foraminous membrane 204 circumferentially surrounding perpendicular deflector blades 206 that are semicircular or truncated semi-circular in shape and angularly inclined and attachedly connected along support rod 208 with at least one collar 210 containing set screw 212 (FIG. 14). The base of the foraminous membrane 204 is fittingly positioned onto flange 214 that tapers downwardly and inwardly and is attached to feed chute assembly 300. The feed chute assembly comprises housing 302 to which is fixedly attached rectangular foraminous membrane 304 along its bottom length. Details of this known assembly are disclosed in U.S. Pat. No. 4,447,325 owned by the assignee of the present invention, and the contents of which are included herein in their entirety by way of reference. The feed chute assembly is attachedly connected to dryer section assembly 400 through inlet 306.

Figure 15A:
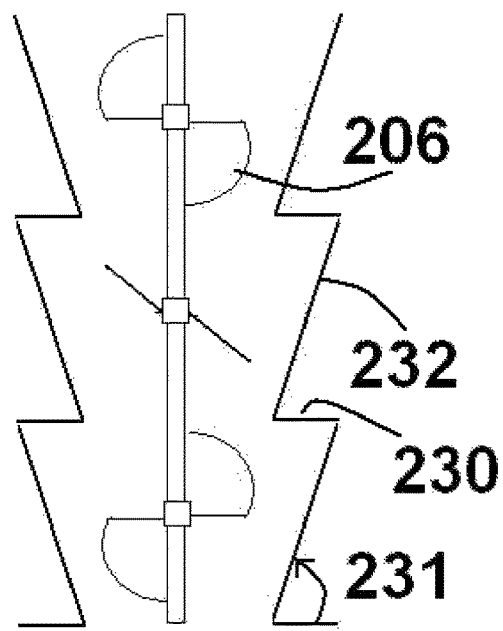
FIG. 15a is a cross-sectional illustration of an angled deflector in a frustoconical dewatering section.
Figure 15B:
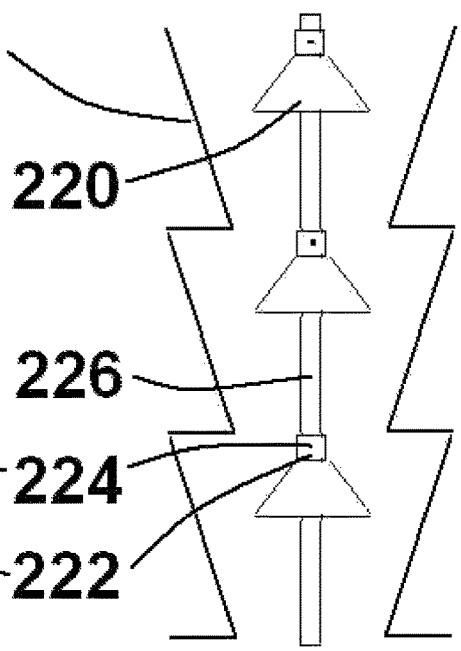
FIG. 15b is a cross-sectional illustration of a frustoconical deflector in a frustoconical dewatering section.
Figure 15C:
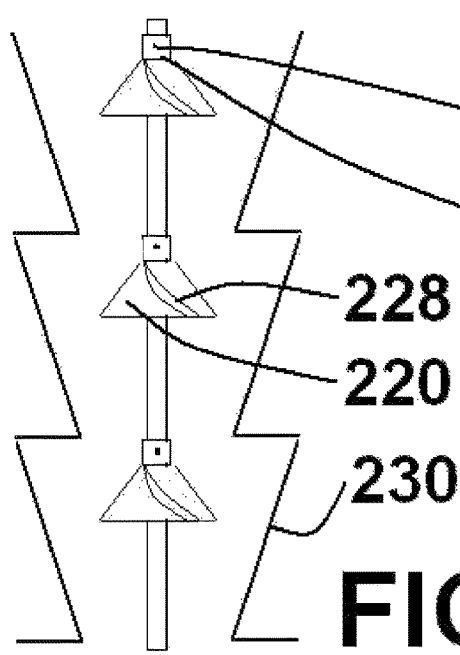
FIG. 15c is a cross-section illustration of a frustoconical deflector with a spirally angular fin in a frustoconical dewatering section.

The known perpendicular deflector blades 206 shown in FIGS. 13, 14, and 15a can be replaced by a downwardly and outwardly tapering frustoconical device 220 weldingly connected to collar 222 with set screw 224 to removably attach the entire assembly to support rod 226 as illustrated in FIG. 15b. Optionally, a spirally tapering fin 226 can be weldingly attached to frustoconical device 220 to confer additional spiral motion to the pellet slurry to improve the fluid removal efficiency, as shown in FIG. 15c. FIGS. 15a, 15b, and 15c illustrate a more preferred embodiment of the present invention wherein the cylindrical foraminous membrane 204 of FIGS. 13 and 14 are replaced by a frustoconical foraminous membrane 230 to which is weldingly attached a planar annular disk 232 such that the outer diameter of the planar annular disk 232 is the same as the largest or top diameter of the frustoconical foraminous membrane 230 and the inner diameter of the planar annular disk 232 is larger than the largest diameter of the perpendicular deflector blades 206 and/or the largest diameter or the bottom of the frustoconical device 220. This allows the support rod 226 or the individual deflector units to be removed and/or replaced independently of the foraminous membrane 204 or the frustoconical foraminous membrane 230. Three such units are shown attachedly connected, preferably by welding, without intending to be limited as at least one such assemblage and preferably at least two or more such assemblages are utilized in the fluid reduction section assembly 200. Descriptions of the foraminous membranes are detailed hereinbelow. The frustoconical foraminous membrane 230 can be at angle 231 being up to 90 degrees, and is preferably in the range of 20 degrees-90 degrees, and more preferably in the range of 40 degrees-90 degrees.

Figure 16:
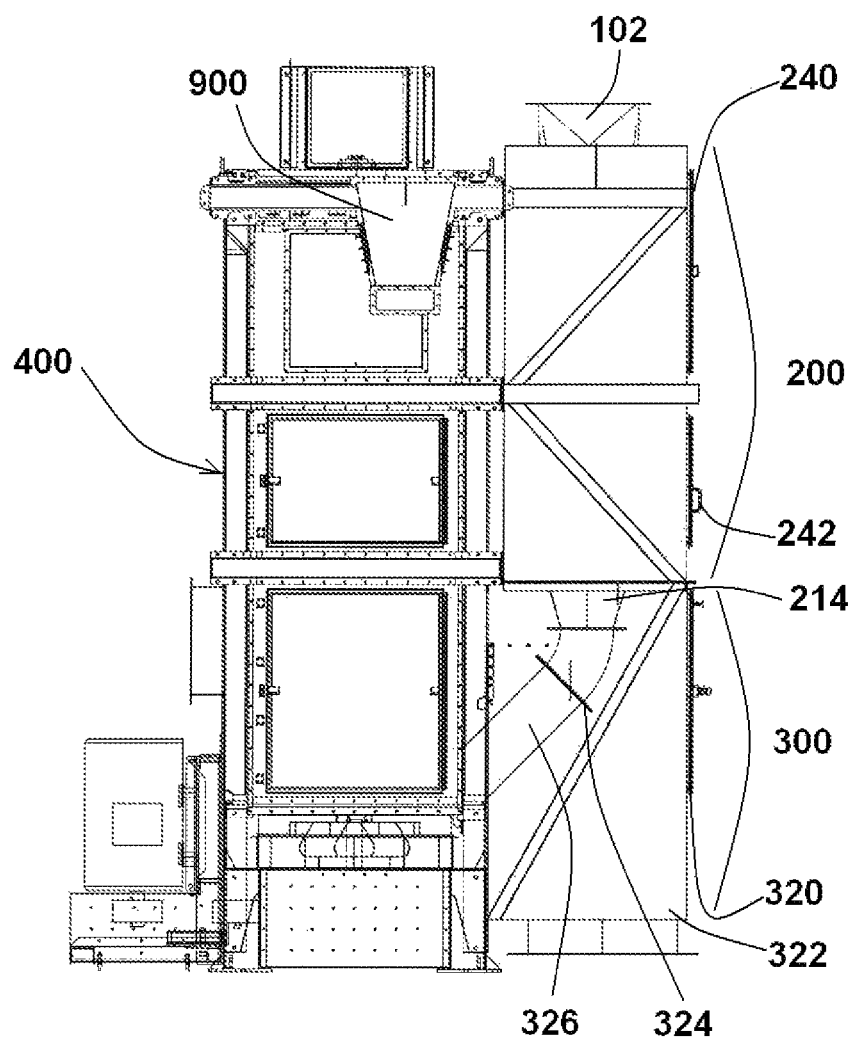
FIG. 16 is an illustration of a dryer assembly section to which is attached a dewatering section and a cylindrical feed chute section.

Turning now to FIG. 16, a portion of dryer assembly 10 without the agglomerate catcher assembly is shown in a different orientation as compared with FIGS. 1a and 1b. As described hereinabove, inlet 102 is attachedly connected to fluid reduction section assembly 200 and feed chute assembly 300 through which defluidized material is introduced to dryer section assembly 400 to which is attached outlet chute 900. Access doors 240 and lower access door 320 are attached and preferably hingedly attached to housing 202 and feed chute housing 322, if separate in construction, and have attached handles 242. In a preferred embodiment of the present invention, flange 214 is attachedly, preferably boltingly, connected to adapter flange 324 that is subsequently attached, preferably boltingly, to cylindrical foraminous feed chute 326 angled downwardly for optional attachment to the inlet of dryer section assembly 400 the attachment of which is not shown in this illustration. To clarify this specific attachment point, FIG. 17, in the orientation as from FIG. 1a, shows the dryer section assembly 400 through which a plane has been passed to cut away near the attachment site. Thus cylindrical foraminous feed chute 326 is weldingly attached to mounting bracket 328 and optionally attachedly, preferably boltingly, connected to the housing 402 of dryer section assembly 400 to provide feed chute outlet 330. Descriptions of the cylindrical foraminous feed chute 326 are detailed hereinbelow.

Figure 17:
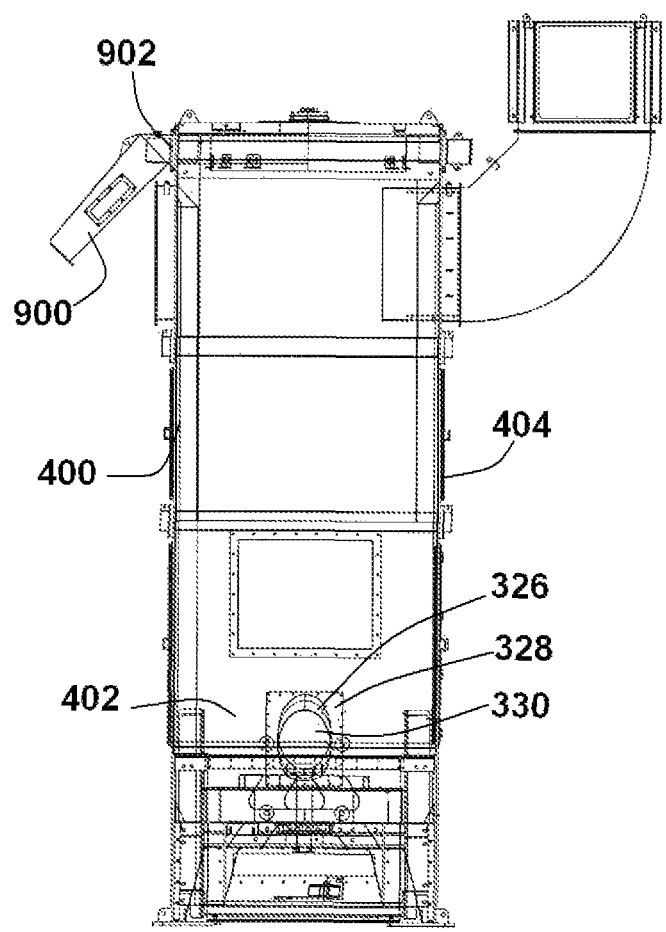
FIG. 17 is a cross-sectional illustration of the dryer assembly section in FIG. 16 illustrating the juncture between the cylindrical feed chute section and its intersection with the housing of the dryer assembly section.

The housing 402 for dryer section assembly 400 in FIG. 17 can be of many geometries, and illustrated here as rectangular for sake of simplicity without intending to be limited. The housing 402 can have a number of access doors 404 attached thereto, preferably hingedly attached, for facilitation of access to the foraminous membranes and rotor assemblies contained therein and to be described subsequently.

Figure 18:
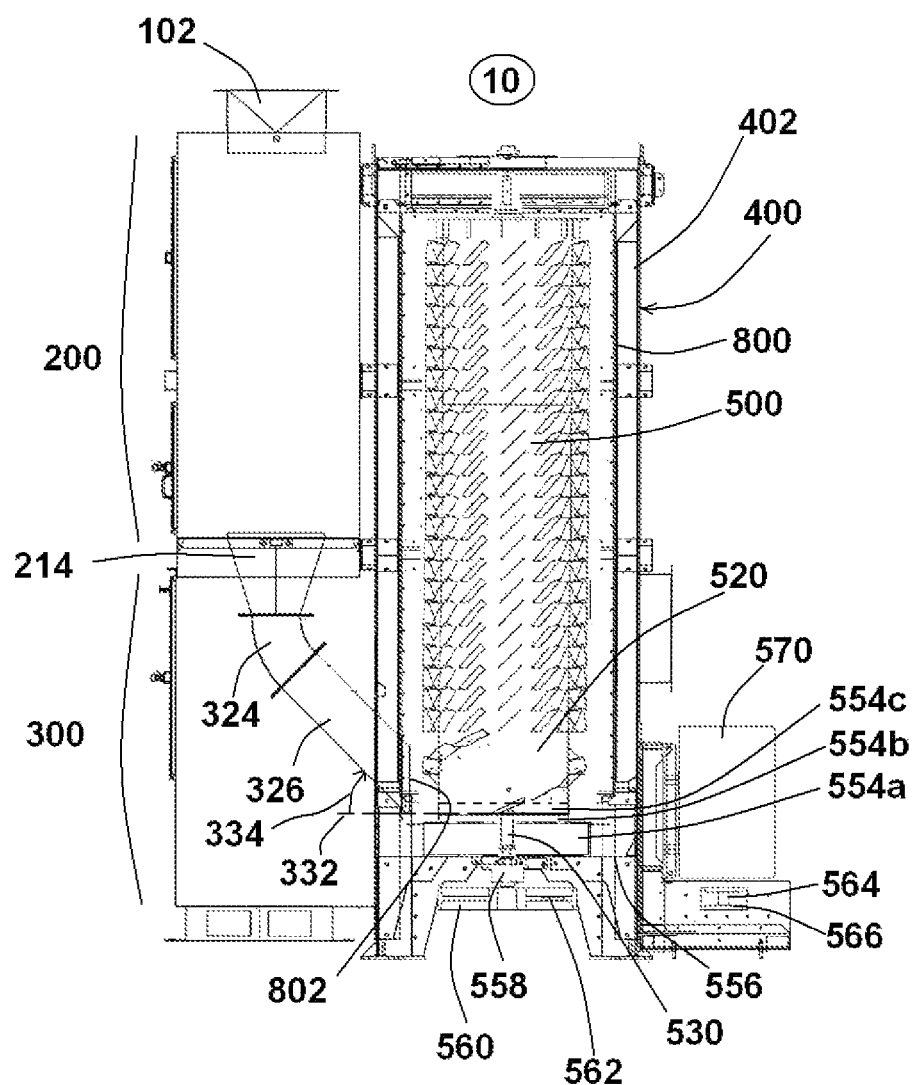
FIG. 18 is a cross-sectional illustration of the dryer assembly section in FIG. 16 in opposite orientation showing the rotor assembly.

In FIG. 18, a portion of dryer assembly 10 without the agglomerate catcher assembly is shown with a plane transecting the assembly such that the rotor assembly 500 and circumferential foraminous membrane 800 are shown within dryer section assembly 400. As illustrated, in a more preferred embodiment of the present invention, the inlet 102 is attached to fluid reduction section assembly 200 and feed chute assembly 300, wherein a preferred embodiment of the present invention includes flange 214 connected to adapter flange 324 that is subsequently attached to cylindrical foraminous feed chute 326 angled downwardly for attachment to the inlet to foraminous membrane 800 at the screen inlet 802 inside housing 402.

The angle of inclination 231 of the foraminous membrane 304 in FIG. 14 and the cylindrical foraminous feed chute 326 in FIG. 18 as measured from the dotted line 332 drawn perpendicularly to the housing 402 at the intersection of the respective feed chute is less than 90 degrees, and is preferably from approximately 20 degrees to approximately 70 degrees, and more preferably is from approximately 30 degrees to approximately 60 degrees.

Figure 19:
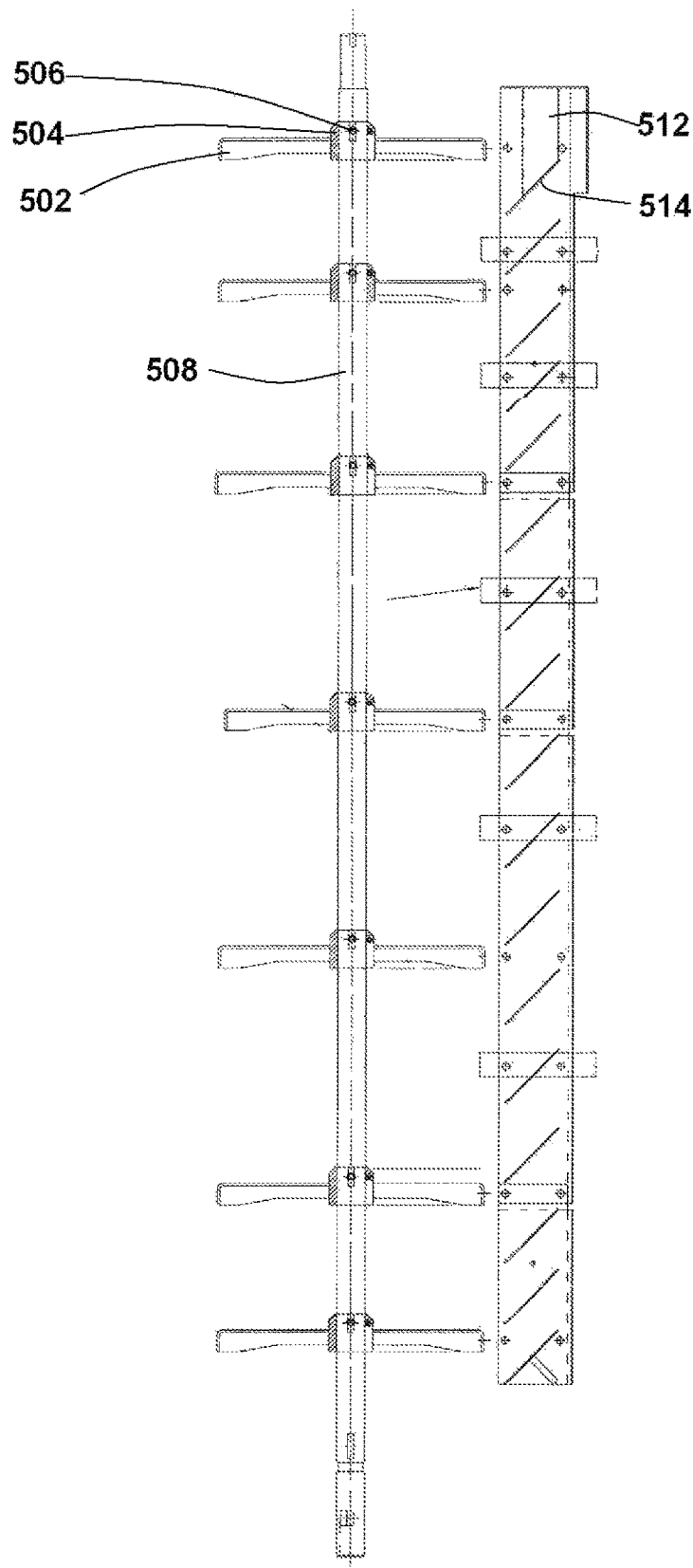
FIG. 19 is a cross-sectional illustration of a prior art rotor showing support structures and backplate assemblies.
Figure 20A:
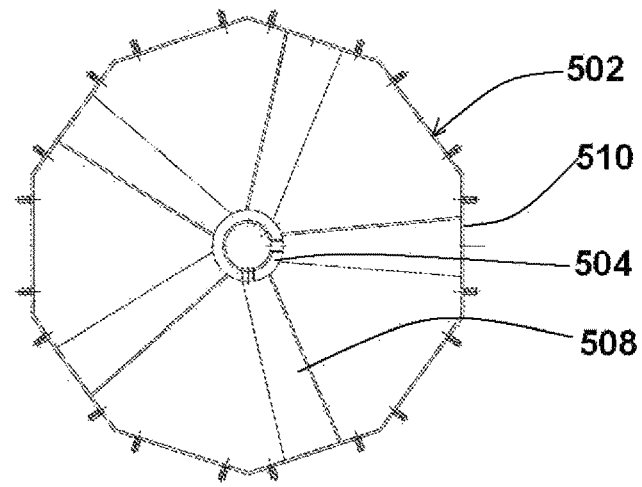
FIG. 20a is a cross-sectional illustration of a prior art rotor support structure from FIG. 19.
Figure 20B:
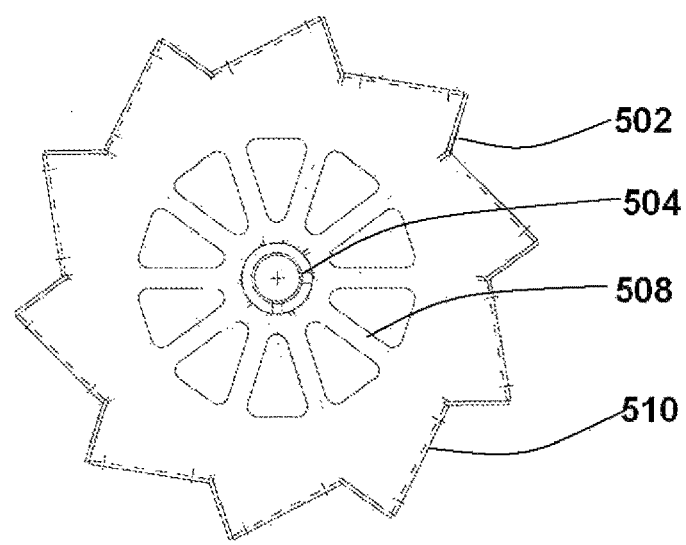
FIG. 20b is a cross-sectional illustration of an alternative prior art rotor support structure from FIG. 19.

The rotor assembly 500 in FIG. 18 can be segmental, solid, and combinations thereof. Segmental rotors as illustrated in FIGS. 19, 20a, and 20b comprise support assemblies 502 weldingly attached to hub 504 containing at least one set screw 506 for attachment, removably and adjustably, to shaft 508 (FIG. 19). Support assemblies 502 can be of many designs and geometries as are known to those skilled in the art, and are shown exemplarily as decagonal in FIG. 20a and angularly decagonal in FIG. 20b without intending to be limited. Support assembles 502 can comprise struts, braces, and structural components 508 in varying numbers and angularities to planar orientation that weldingly attach to hub 504 as well as to circumferential attachment components 510 generically identified for purposes of illustration as these structures are known to those skilled in the art. To these support assemblies 502 are boltingly attached backplates 512 to which are attachedly connected, boltingly and/or weldingly, angularly oriented blades 514.

Figure 21:
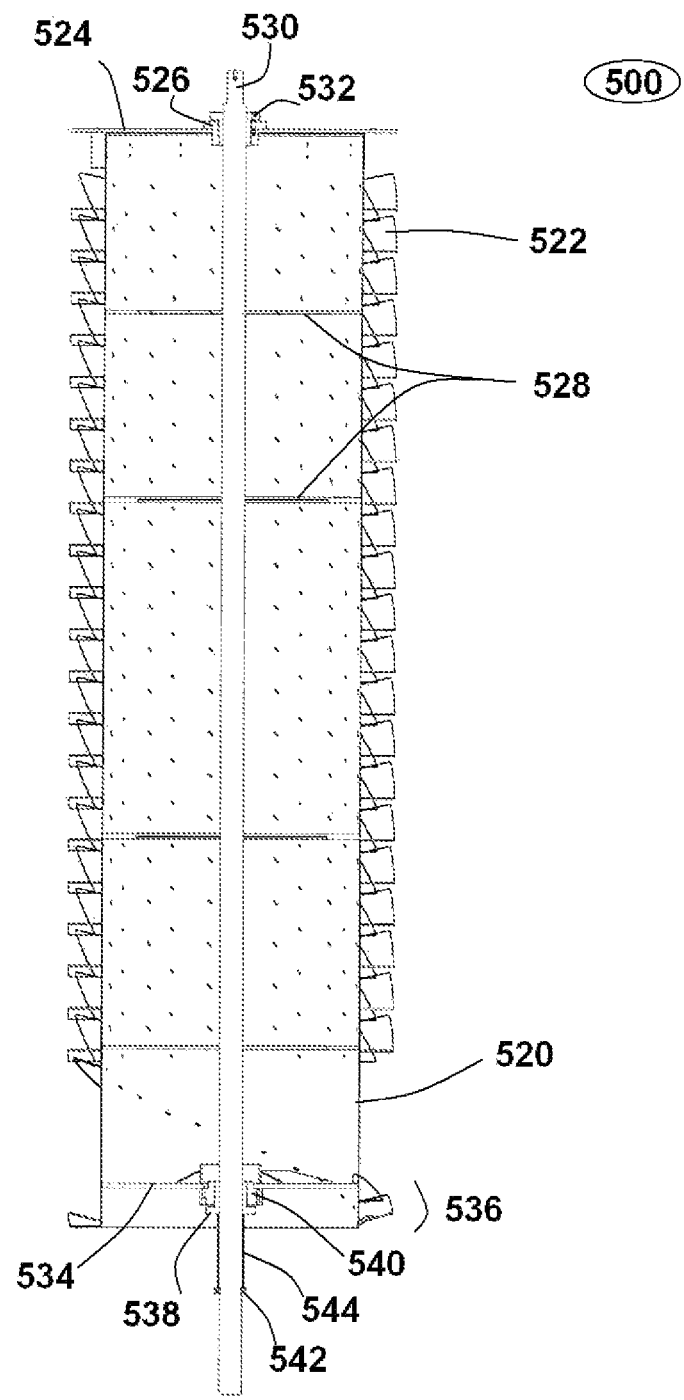
FIG. 21 is a cross-sectional illustration of the rotor assembly from FIG. 18.
Figure 21A:
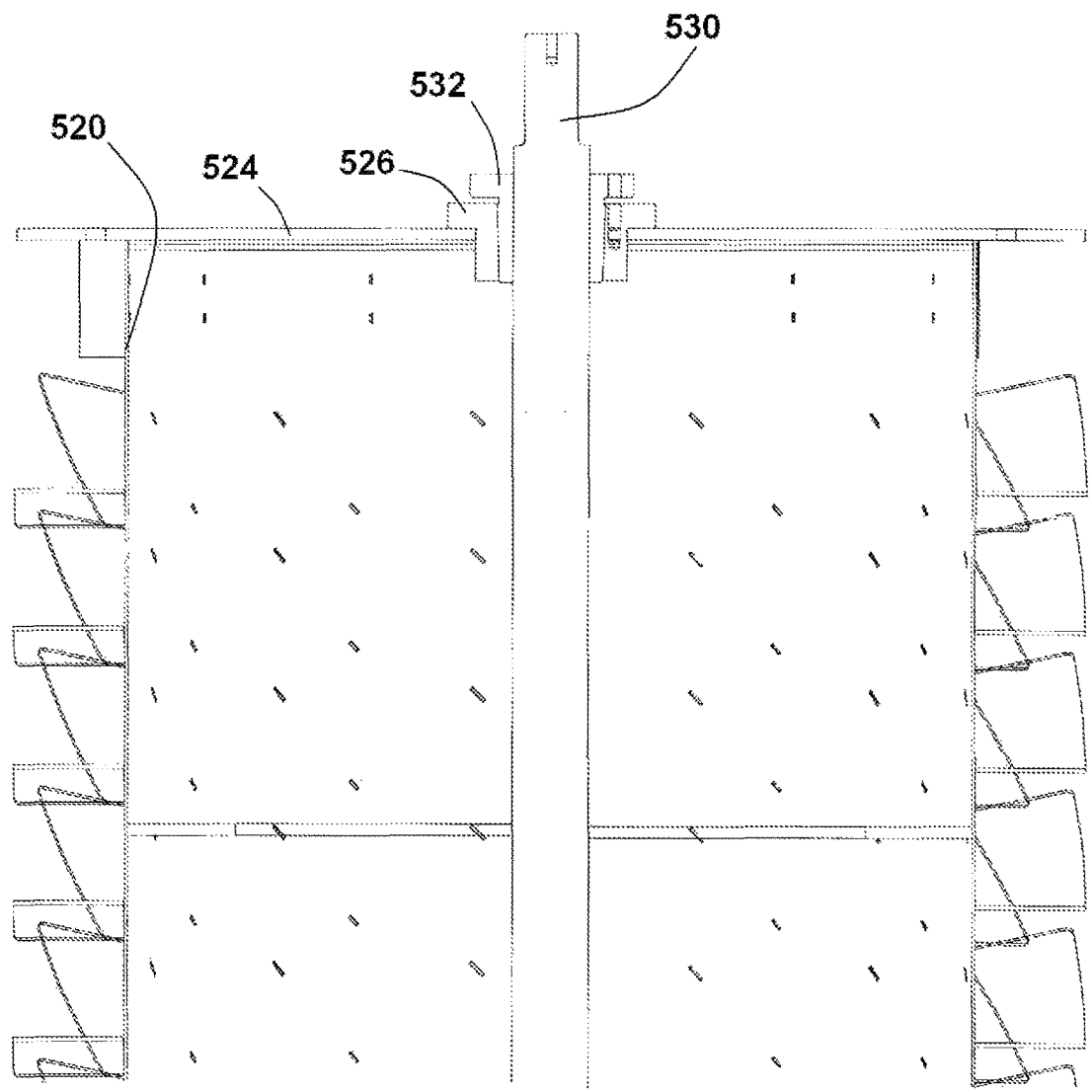
FIG. 21a is an expanded view cross-sectional illustration of the top portion of the rotor assembly in FIG. 21.

A solid rotor assembly 500, FIG. 21, comprises circumferentially and uniformly geometric, preferably cylindrical, rotor 520 to which are attached, preferably by welding, angularly oriented blades 522. An annular disk 524 is welded to the top of the rotor 520 such that the outer diameter of the disk is at least the same as the diameter of the rotor 520. The inner diameter of annular disk 524 is the same as the outer diameter of upper hub component 526 to which it is weldingly attached. A multiplicity of internal annular disks 528 are weldingly attached to the inner circumference of the rotor 520 to provide additional structural support such that the inner diameter is significantly greater than the diameter of shaft 530. A tapered bushing 532 is placed onto shaft 530 and inserted into upper hub component 526 and is fittingly and securingly adjusted to insure simultaneous and synchronous rotation of the rotor 520 with shaft 530 as better detailed in FIG. 21a. Rotor 520 can be assembled from a multiplicity of components, preferentially cylindrical components, that are weldingly attached. The internal annular disks 528 optionally can be placed internal to these welds as well as a multiplicity of other locations for purposes of reinforcement without intending to be limiting.

In FIG. 21 and detailed in FIG. 21b, an annular disk 534 is weldingly attached inside the rotor 520 a distance 536 at least as far from the lowermost edge as the smallest vertical dimension of the base structure about which it rotates, as detailed hereinbelow. A tapered bushing 538 is placed onto shaft 530 and inserted into lower hub component 540 and is fittingly and securingly adjusted to insure simultaneous and synchronous rotation of the rotor 520 with shaft 530. Between tapered bushing 538 and circumferential locking collar 542 is a cylindrical spacer 544 that provides additional support to prevent possible failure of the lower rotor bushing support components. Locking collar 542 fits into a groove 546 circumferentially inscribed about shaft 530.

Figure 21B:
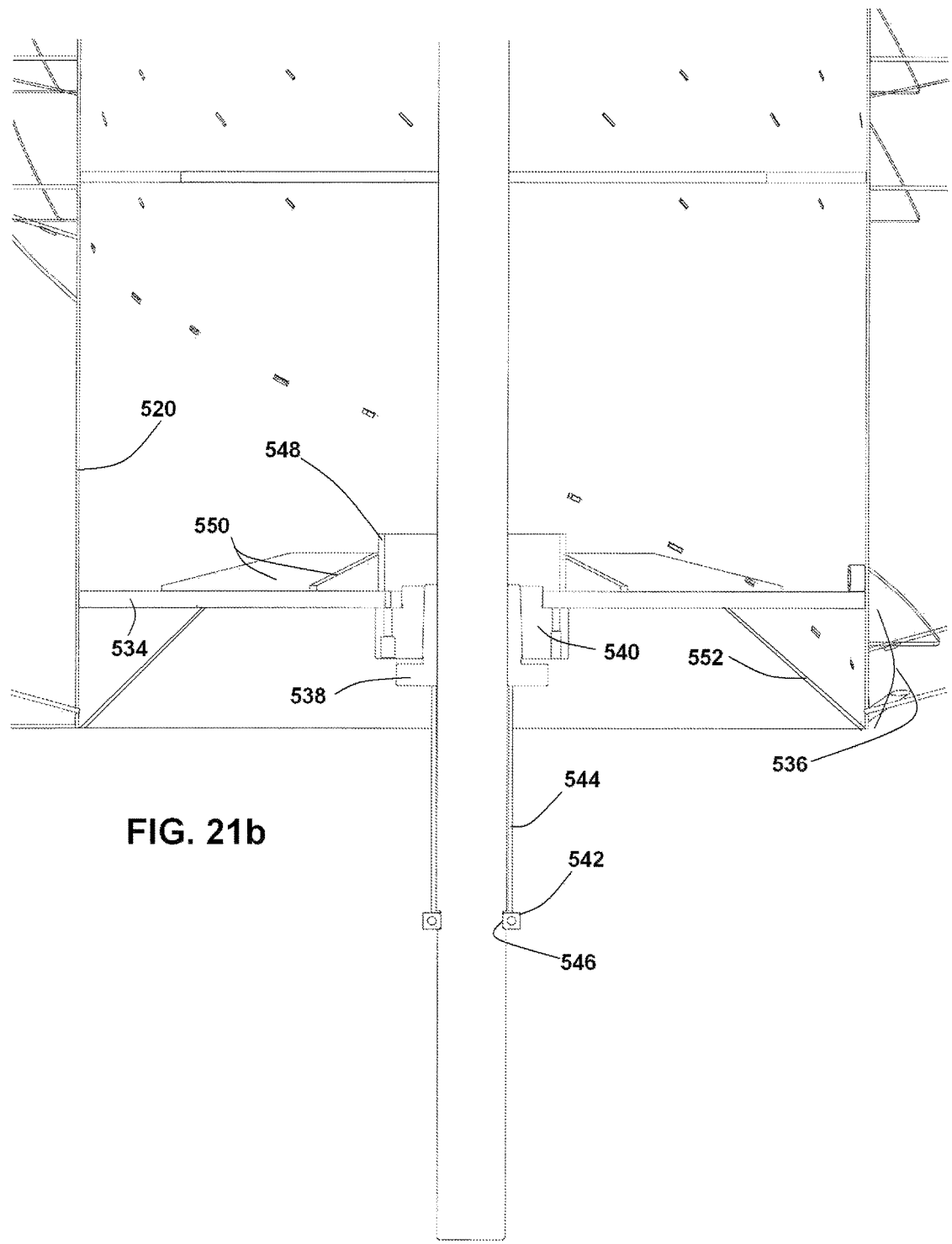
FIG. 21b is an expanded view cross-sectional illustration of the bottom portion of the rotor assembly in FIG. 21.

As further illustrated in FIG. 21b, optionally mounted above annular disk 534 is annulus 548 circumferentially about rotor 530 and weldingly attached to annular disk 534. To the annulus 548 can be weldingly attached a multiplicity of fins 550 perpendicularly oriented to the annulus to provide additional structural support as needed. Beneath annular disk 534 can be weldingly attached optional deflector fins 552 that facilitate removal of potential contaminants within the rotational areas of the dryer section assembly 400. These fins 552 can be many geometries in an angularity of placement and are preferentially triangular with torsional angularity toward the direction of rotation. The torsional angularity of fins 552 can be 90 degrees or less as determined relative to the perpendicular plane of the annular disk 534. Preferably the torsional angularity is approximately 20 degrees up to and including 90 degrees, and more preferably the torsional angularity is at least 40 degrees up to 90 degrees.

Returning to FIG. 18, the shaft 530 extends below solid rotor assembly 500 into and through a two-part support structure 554a and 554b the latter of which extends upwardly and interiorly of the rotor itself as indicated by dotted line 554c. The distance 536 described in FIGS. 21 and 21b is defined as at least the distance equivalent to the height of the uppermost component 554b and fortuitously placed positionally above the dotted line 554c as illustrated in FIG. 18. It is about this two-parted support structure that the base of the foraminous membrane 800 fits securely as detailed hereinbelow. The shaft 530 extends downwardly from the two-part support structure 554a and 554b through baseplate 556, bearing 558 into and through driven pulley 560. The driven pulley is attached by a belt 562 to a drive pulley 564 on the drive shaft 566 of motor 570. Without intending to be limited, the motor 570 can also be drivingly connected to the top of the shaft and can also be directly and collinearly attached directly to the shaft as is understood by one skilled in the art. As the dryer size increases, the collinearly direct drive can be problematic as the torque also increases; thus, the drive and driven mechanisms are preferred. Similarly increased size confers increased weight; thus, the motor 570 as illustrated in FIG. 18 is a more preferred configuration.

The belt 562 can be a chain or a belt including flat belts, round belts, V-belts, rotary belts or chain belts, cog belts or timing belts, and the like wherein cog belts are preferred for use to avoid undesirable slip or backlash between the drive and driven mechanisms. More preferably the cog belt is not prone to slip and is chemically resistant with minimum stretch or distension on regular use. Most preferably, the cog belt provides reproducible translation of motion from the drive mechanism to the driven mechanism at slow speeds under high torque loading without slip and without distension.

Figure 22:
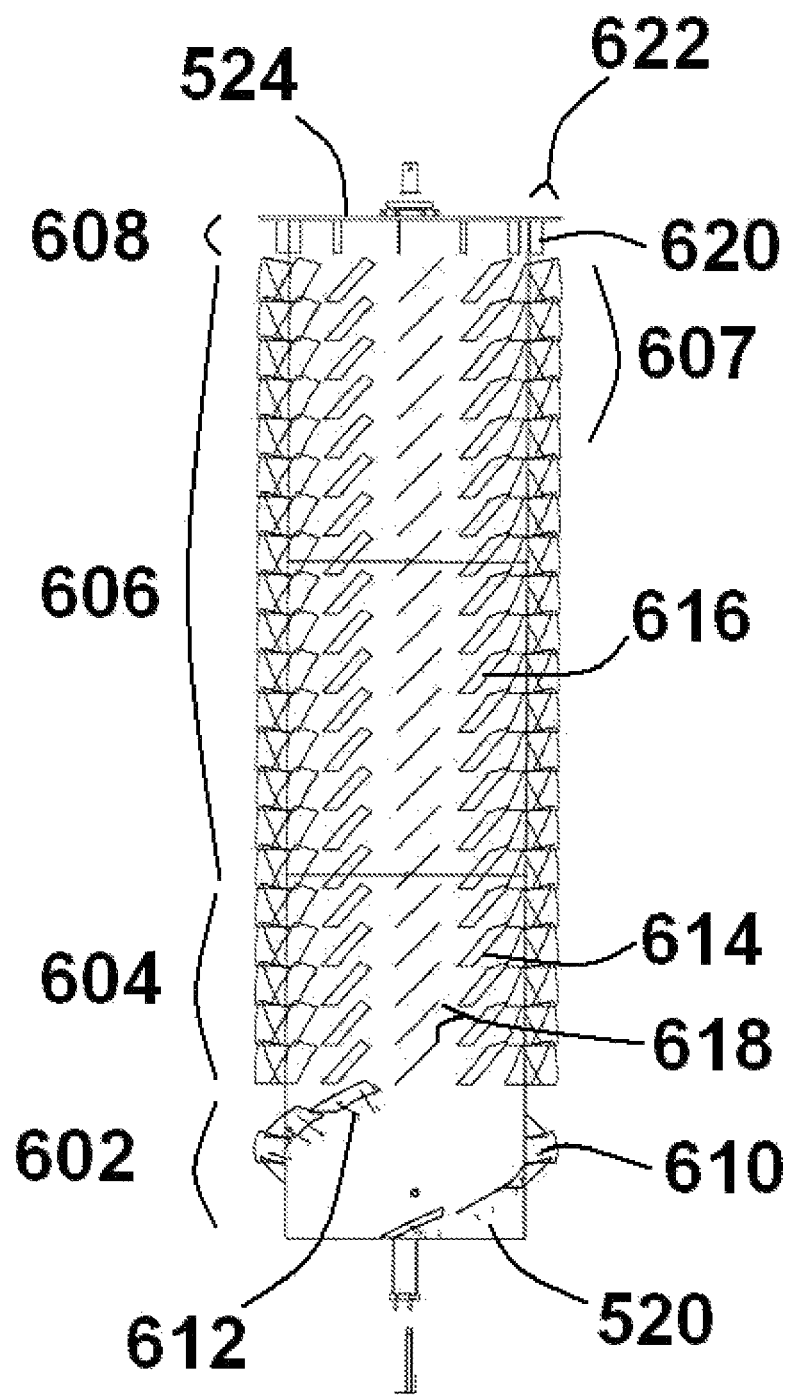
FIG. 22 is an illustration of the rotor assembly from FIG. 18.

According to a preferred embodiment of the present invention, the positioning and orientation of the blades 522 on and about the rotor assembly 500, and most preferably in the solid rotor configuration, are of considerable significance in determining the efficiency of the overall drying process. As such, the rotor assembly 500 of FIG. 22 is arbitrarily sectioned into four regions for consideration. A wet pellet feed section 602 receives the deliquified pellets from the feed chute assembly 300 (FIG. 18) and redirects the flow of the pellets from approximately horizontal to more spirally vertical providing additional velocity on impact with the blades 522 while further facilitating removal of residual fluid through the same impacts with the blades 522 as well as with the foraminous membrane 800. Being able to feed the wet pellets into the dryer is an important concern in consideration of this region of the drying process. Following the wet pellet feed section 602 is a residual fluid reduction section 604, wherein the superficial or surface liquid on the pellets is effectively removed by impacts with the blades 522 in combination with the foraminous membrane 800.

As fluid on the pellets becomes more significantly reduced from inlet, through wet pellet feed section 602, and through residual fluid reduction section 604, the drying pellets propagate into and through a drying section 606 where the final trace of moisture achievable for a particular material is accomplished. The now dry pellet is redirected out of the dryer as facilitated by an ejection section 608, and exits through the pellet outlet chute 900 as illustrated in FIGS. 1a, 1b, 16 and 17.

Drying of the pellets thusly is affected by the residence time in the drying process, the efficiency of the drying equipment, the chemical composition of the pellets, the temperature of the pellets, the temperature maintained in the drying equipment, the air-flow through the drying equipment, the frequency and effectiveness of the collisions of the pellets, the varying moisture levels occurring in different portions of the drying equipment through which the pellets must pass, as well as the nature and chemistry of the fluid being removed from the pellets. Importantly, the design of the rotor is of importance to how all of these variables can be positively modified to affect a dry pellet on exit from the drying process.

The typical conventional rotary places the blades at 45 degrees angles relative to a horizontal axis transcribed across the rotor. To extend the residence time of the pellets, the angles can be lowered, thus providing less lift and slowing down the vertical rise through the dryer.

To facilitate feeding into the dryer it was discovered that the pellets were effectively being blocked from entry into the dryer in many cases where a large number of blades were present at the inlet with high rotation rates of the rotor. The angle of the blades was also discovered to be problematic in that the impact angle of the pellets hitting the blade, if incorrectly positioned, could potentially reject the pellet back out of the drying and into the feed chute assembly. Number of impacts can be greatly enhanced by using more blades and positioning them closer, and this is of particular importance as the pellet mass and/or the pellet size decreases as with flake materials or small diameter or essentially micropellets.

It was further found that the proximity of the trailing edge of the lower tier of blades to the leading edge of the next tier of blades, if improperly spaced, can leave a gap through which banding about a horizontal plane along the inner screen becomes problematic. The shape of the blade also influences migration of the pellets through the drying process. The angle at which the fluid is effectively removed from the pellets and impacts the screen to efficiently be removed from the process is also important. It was also realized that passing a plane through the rotor at a 45 degrees angle also changes the orientation of the blade with respect to a position further up or further back positionally along that plane; thus, movement of the blades along that plane had varying and significant effects on the throughput rate and drying efficiency of the process as a whole. The width of the space between the blades and the wall of the screen as well as the width and orientation of the blades proximal to the outlet chute are also of importance.

Thus, in a preferred embodiment of the instant invention as illustrated in FIG. 22, wet pellet feed section 602 has a reduced number of blades essentially forming at least one helical configuration, and preferably at least two helical configurations of the blades in which the blade angle defined by the inclination of the trailing edge above that of a plane drawn horizontally through the leading edge is no greater than 45 degrees, and preferably is less than 45 degrees, most preferably less than 35 degrees. The helical blades 610 of wet pellet feed section 602 can be longer than the blades in other portions of the assembly, and preferably are at least 1.25 times the length, more preferably at least 1.5 times the length. The angle of the blade from the outside edge to that of a plane drawn through the attached edge can be in a range from 0 degrees to +20 degrees, and preferably is from 0 degrees to minus 20 degrees. The blades lowest positionally in the helix are preferably at a lower angle of the trailing edge as related to a plane through the leading edge than are those progressively spiraling upward through the assembly and the angle of the lowest blade as related to the outside edge relative to a plane through the attached edge is preferably 0 degrees to less than 40 degrees, and most preferably is 0 degrees to less than 30 degrees.

As the greatest mass of material including residual fluid impacts the helical blades 610 directly, they can be provided with at least one angular support 612 perpendicularly attached, preferably weldingly, to the underside of the helical blade 610 and angularly attached, preferably weldingly, to the rotor 520. The angularity with respect to the rotor 520 is such that the angular support 612 is perpendicularly oriented to the face of the rotor itself and is angularly disposed in its attachment to the face of the rotor such that it retains its perpendicularity with the helical blade 610 at the angle at which the blade is inclined as considered from the trailing edge of the blade relative to a plane drawn through the leading edge of the same blade. Preferably at least two angular supports 612 are attached, preferably weldingly, to each helical blade 610.

Turning now to the residual fluid reduction section 604 of rotor 520 shown in FIG. 22, the blade angle of the trailing edge of blade 614 relative to a plane drawn through the leading edge of the same blade can be the same as, and preferably is steeper than, that of the wet pellet feed section 602 and can be the same as the blade angle of the drying section 606. Wherein fluid removal from a particular material is more problematic or requires additional residence time, the blade angle in the wet pellet feed section 602 can be lowered to reduce the effective lift and thus increase the number of collisions as well as the residence time of the pellets in this section of the dryer.

To improve residence time and/or effective reduction of fluid, preferably the angle of the blade 614 is greater than that of the blade 610 and less than that of the blade 616 in the drying section 606. Additional collisions can be achieved by placing a greater number of blades 614 in the wet pellet feed section 602 such that the distance 618 between successive rows of blades 614 is reduced. Similarly increasing the angle of the outside edge of the blade 614 relative to that of a plane drawn through the attachment of the blade 614 to rotor 520 can be used to effectively increase the number of collisions. Preferably this angle is from 0 degrees to at least 20 degrees. Alternatively the outside edge and/or the trailing edge can be curved relative to the body of blade 614, but this is preferably avoided because of the increased difficulty introduced in reproducibly controlling the manufacture and assembly of increasingly complex curves in the component parts. Optionally supports can be added to the blades 614 as needed as described above for helical blade 610.

As noted hereinabove, the blades 616 in the drying section 606 can be at the same angle as that of the blades 614 in the wet pellet feed section 602, wherein the angle of consideration is that of the trailing edge of the blade relative to a plane drawn through the leading edge of the same blade. Preferably this angle of blade 616 is at least the same and more preferably is greater than that of the angle of blade 614. As more residence time is deemed necessary, the angle can be reduced. Alternatively and optionally, the angle of the blades 616 in the lower portions of the drying section 606 can be different than that of progressively higher blades in the same section to facilitate more ready acceleration of the rapidly drying pellets through and ultimately out of the drying process. Additionally the distance between blades, the curvature of the outside edge of the blades, the curvature of the trailing edge of the blades, and the curvature of the leading edge of the blades can be different in different portions of the drying section 606 as needed. Preferably for ease of construction the number of variations across the drying section 606 is minimized and most preferably the blades, angles, and curvature are uniform across the region.

For materials that tend to be tacky, sticky, and are prone to want to adhere, it is advantageous to reduce the blade width in an upper drying section 607 of drying section 606. Preferably, the blade width is at least 5% narrower, more preferably it is at least 10% narrower, and most preferably is at least 20% narrower than blades 616 of the rest of drying section 606. Without intending to be bound by any theory, this effectively increases the open, non-collision area in the upper region of the dryer thus reducing the likelihood as well as the energetics of the collisions between particles.

The ejection section 608 in FIG. 22 is comprised of blades 620 that are intended to redirect pellets as they move spirally up the dryer such that they are horizontally propagated out of the dryer in the area of the pellet outlet chute 900 (see FIG. 1a). The blades 620 are at angles at least that of the angle of blades 614 and blades 616, and preferably are at angles greater than that of these blades. Most preferably, the angle of the uppermost edge of blade 620 relative to that of the lowermost edge of the same blade is at least 45 degrees, still more preferably the angle is at least 70 degrees, and most preferably is at least 80 degrees and greater. The blades 620 can be positioned about the rotor 520 such that they are directly adjacent to the trailing edge of the preceding row of blades, and preferably are between the trailing edges of adjacent blades in the preceding row of blades as illustrated in FIG. 22. The width of the blades 620 must not exceed the distance 622 between the rotor and the outermost edge of annular disk 524, and preferably is less than that distance 622. Optionally, the blades 620 can be omitted from the assembly. Blades 620 are attachedly connected, preferably weldingly, to the rotor 520 and optionally can be attached to the annular disk 524, preferably by welding. Wherein the blade 620 is aligned with blade 616 in the preceding row, the trailing edge of blade 616 and the lowermost edge of blade 620 can optionally be weldingly attached.

The respective sections of the rotor assembly 500 can be of many proportionate arrangements on the rotor. Preferably, the wet pellet feed section 602 is the same height as the uppermost height of the screen inlet 802 inside housing 402 as shown in FIG. 18, the residual fluid reduction section 604 is at least one-tenth the height of the drying section 606, and the ejection section 608 is the same height as that of the outlet 902 to outlet chute 900 (FIG. 17). When the width of the blades 616 is reduced in the upper drying section 607, the preferred height of that section is at least one fifth that of the height of the rotor 520.

Figure 24A:
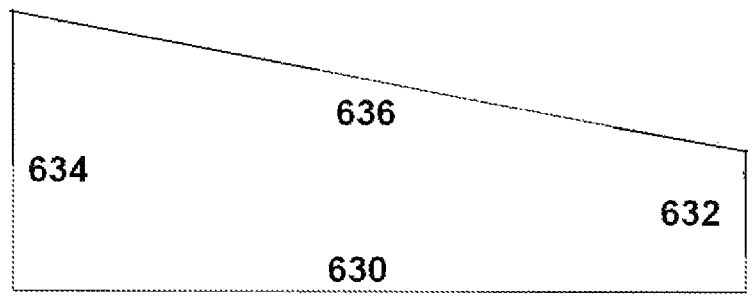
FIG. 24a is an illustration of the blade design on the rotor in FIG. 18.
Figure 24B:
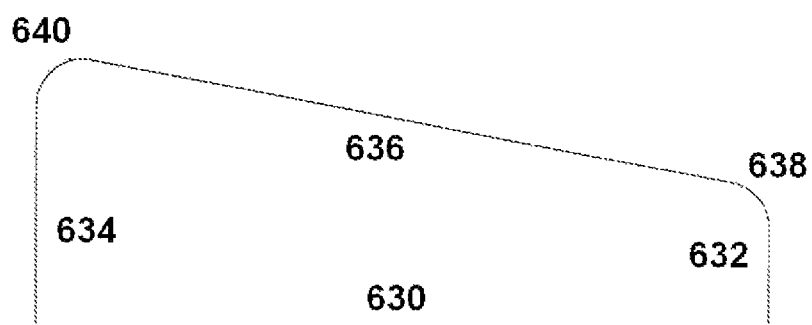
FIG. 24b is an illustration of an alternative blade design on the rotor in FIG. 18.
Figure 24C:
FIG. 24c is an illustration of another alternative blade design on the rotor in FIG. 18.

The shape of the helical blades 610 as well as blades 614, 616, and 620 in FIG. 22 can be of many geometries, and preferably are a modified quadrilateral as illustrated in FIGS. 24a, 24b, and 24c. Attachment edge 630 conforms to the radius of rotor 520, FIG. 22, and is illustrated here as a line for simplicity of illustration as the radius of different size dryers will vary. Trailing edge 632 is no greater in length than is leading edge 634 and the length of outside edge 636 is dependent on the relative lengths of trailing edge 632 and leading edge 634. In FIG. 24a the trailing edge 632, leading edge 634 and outside edge 636 are all approximately linear resulting in approximately angular intersections. In FIG. 24b corner 638 and corner 640 are radiused to reduce the angularity, and in FIG. 24c the outside edge 642 is radiused along its length. The various blades in the various regions can be of similar design, but preferably are of different design to serve different purposes respective of their locations.

Figure 23:
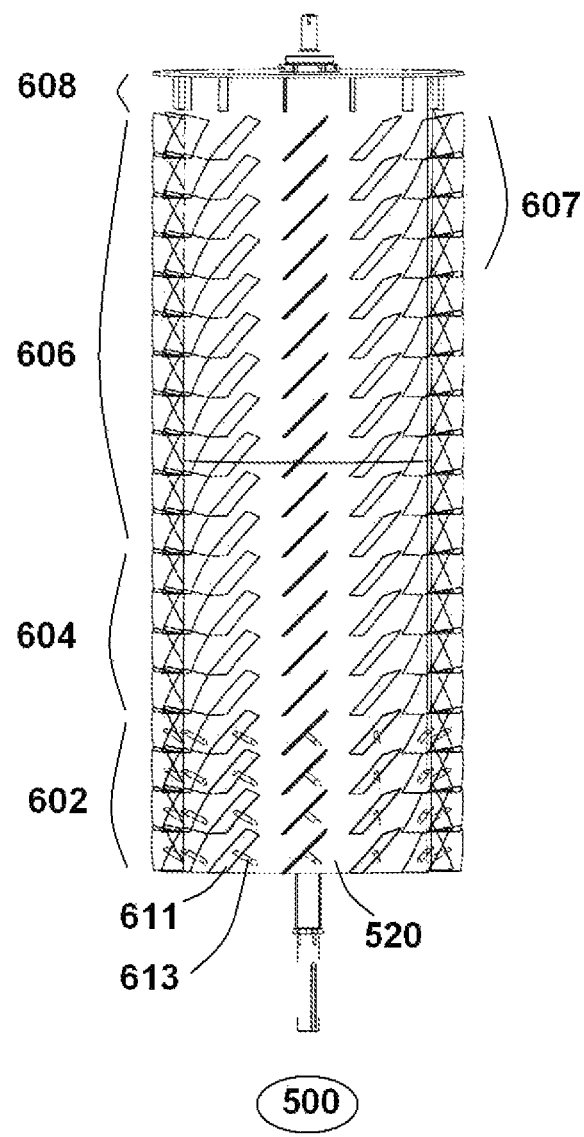
FIG. 23 is an illustration of an alternative rotor assembly from FIG. 18.

Returning to FIG. 22, the relative positioning of the blades can be of many arrangements on the rotor 520, and preferably for ease of manufacturing the blades in the residual fluid reduction section 604 and the drying section 606, are in rows aligned in parallel planes that lie perpendicularly to the axis of the rotor as well as in columns in parallel lines aligned with the axis of the rotor as shown. The trailing edge of blades in one row are preferably in the closest vertical proximity to the leading edge of blades in the next higher row, and the plane drawn through the trailing edge of the blade in one row does not have to be in the same plane drawn through the leading edge of the blade in the next higher row. Similarly, the vertical plane formed by the trailing edges of the blades in a column do not have to be in the same vertical plane formed by the leading edges of the blades in an adjacent column. The trailing edge of the uppermost helical blade 610 in the wet pellet feed section 602 preferably is in the closest proximity to the leading edge of the lowest blade in the residual fluid reduction section 604, but is not necessarily coplanar therewith. In an alternative configuration in FIG. 23, the blades in all equivalent sections, equivalently numbered, of rotor assembly 500 are of approximately the same shape and size and all rows of blades are in parallel planes oriented perpendicularly to the axis of the rotor 520 and the columns of blades are in parallel lines aligned with the axis of the rotor 520. As discussed before, it is preferred that blades 610 in the wet pellet feed section 602 have at least one support 612 as described hereinabove for the helical blades 610, FIG. 22.

Figure 25:
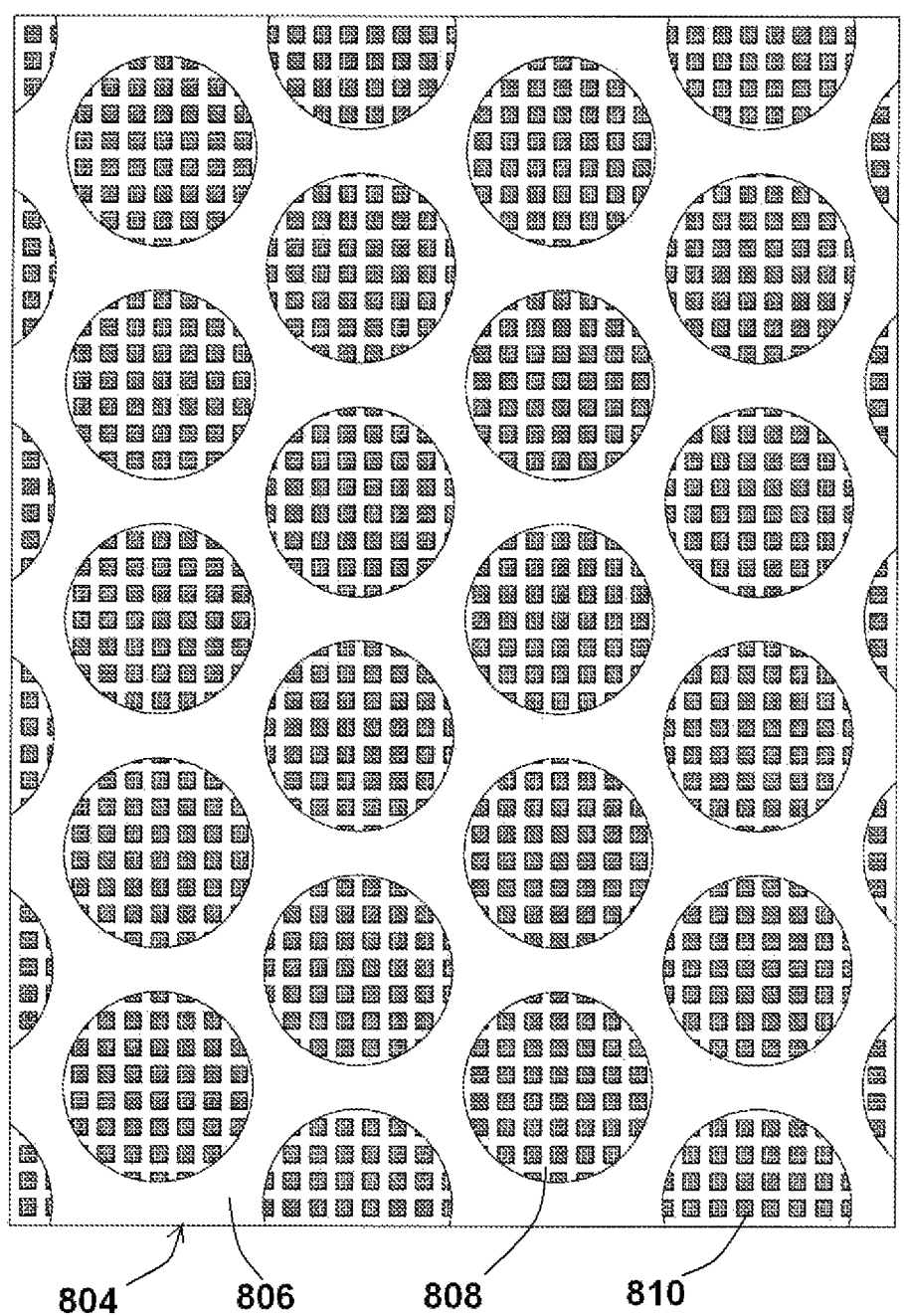
FIG. 25 is an illustration of a multi-layer screen.
Figure 26:
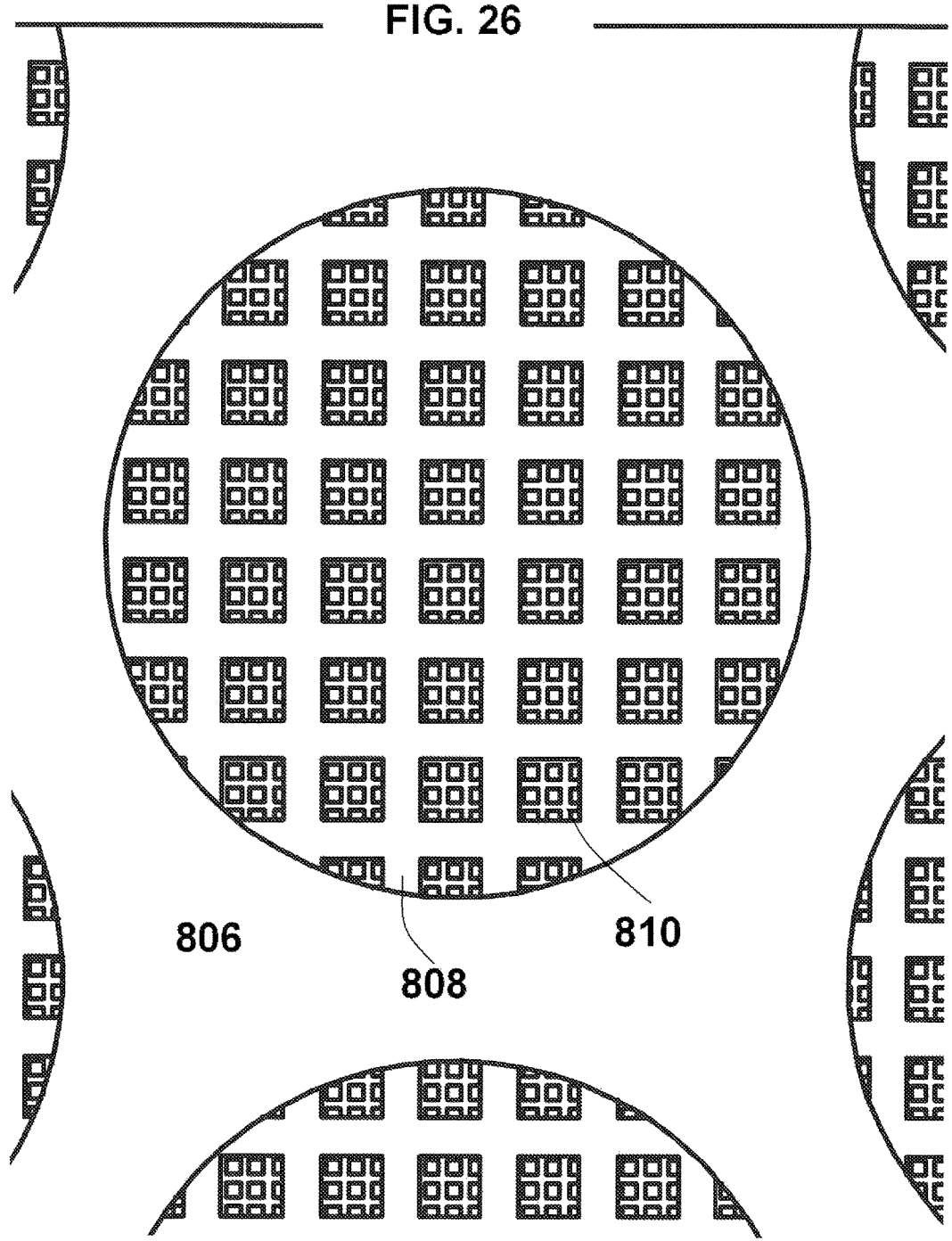
FIG. 26 is an expanded illustration of the multi-layer screen in FIG. 25.

The multiplicity of foraminous membranes including the multiplicity of cylindrical screen members or foraminous membranes 204 in FIG. 13, the rectangular foraminous membrane 304 in FIG. 14, the frustoconical foraminous membrane 230 in FIGS. 15a, 15b, and 15c, the cylindrical foraminous feed chute 326 in FIGS. 16, 17, and 18, as well as the multiplicity of circumferential foraminous membranes 800 and any multiplicity thereof, can be of at least one layer in composition. The size, composition, and dimensions of the foraminous membranes should accommodate the pellets being generated and can be perforated, punched, pierced, woven, or of another configuration known to those skilled in the art and can be the same or different in construction, composition, and style. As the pellet size decreases in diameter, preferably the foraminous membranes will be composed of two or more layers that can be of similar or different composition, design, and size. Multilayer foraminous membranes are described in U.S. patent application Publication No. 2006/0130353 owned by the assignee of the present invention, the contents of which are disclosed herein by way of reference in their entirety. FIG. 25 illustrates an exemplary three layer foraminous membrane 804 which is subsequently detailed in FIG. 26, wherein the three layers include an outer support layer 806, an optional intermediate layer 808 and an inner layer 810. The foraminous membranes are fixedly attached by latches, clamps, bolts, and other mechanisms appropriately understood by those skilled in the art.

Compositionally, the foraminous membranes can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers.

Preferably, the foraminous membrane can comprise a perforated, punched, pierced, or slotted metal plate to form openings that can be round, oval, square, rectangular, triangular, polygonal, or other structures to provide open areas for separation and subsequent drying, and is of suitable thickness to maintain the structural integrity of the overall assembly and flexible enough to be contoured, exemplarily cylindrically, to fit tightly and positionally in the appropriate fluid removal, feed chute and drying assemblages. The metal plate is preferably 18 gauge to 24 gauge, and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel and their low carbon equivalents as necessitated environmentally by the chemical processes undergoing the drying operation.

Figure 27A:
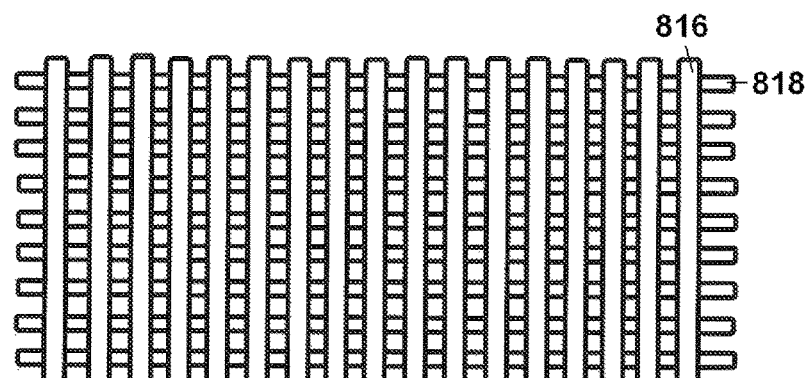
FIG. 27a is an illustration of a sintered foraminous membrane in which horizontal elements are connected perpendicularly in relation to the vertical elements.
Figure 27B:
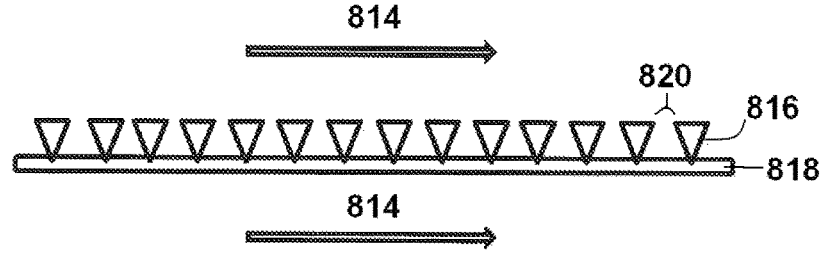
FIG. 27b is a cross-sectional illustration of the foraminous membrane in FIG. 27a wherein the horizontal elements are attached in a vertically perpendicular orientation to the vertical elements.
Figure 27C:
FIG. 27c is a cross-section illustration of the foraminous membrane in FIG. 27a wherein the horizontal elements are attached angularly to the vertical elements.
Figure 27D:
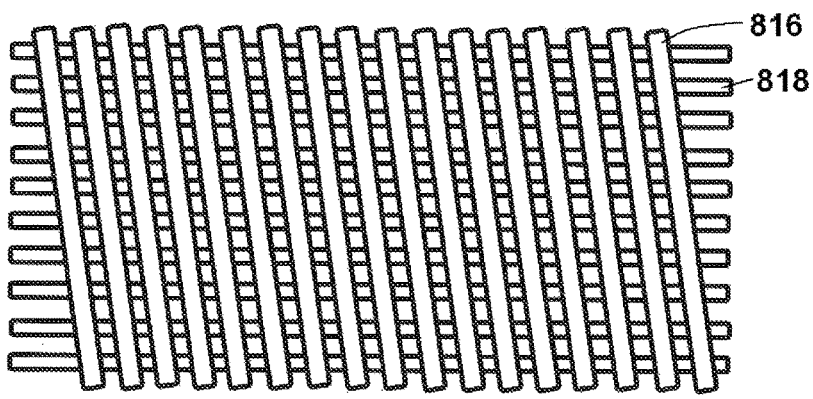
FIG. 27d is an illustration of a sintered foraminous membrane in which the horizontal elements are attached angularly to the vertical elements.
Figure 27E:
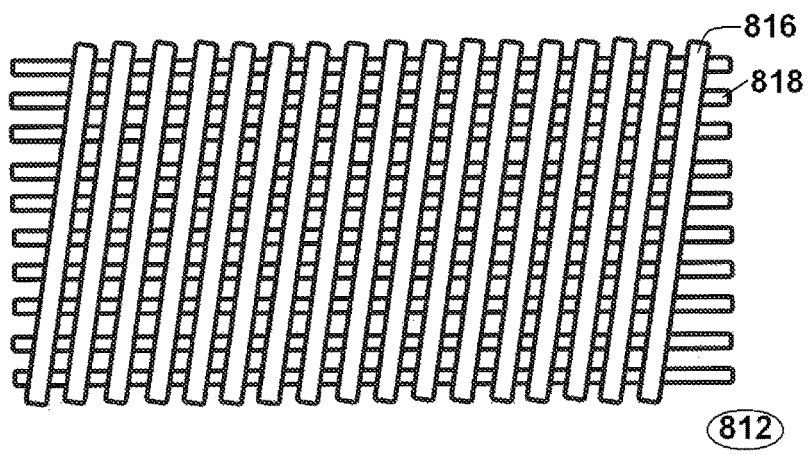
FIG. 27e is an illustration of a sintered foraminous membrane in which the horizontal elements are attached angularly to the vertical elements in an orientation opposite to that of FIG. 27d.

Alternatively and more preferably, the foraminous membrane can be an assembled structure or screen composed of wires, rods, or bars, stacked spirally, angularly or orthogonally, or interwoven, and welded, brazed, resistance welded or otherwise adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal and other geometric structure as is known to those skilled in the arts. The wires, rods, or bars across the width of the foraminous membrane can be the same as or different dimensionally as the wires, rods, or bars longitudinally or as otherwise known to those skilled in the art. FIGS. 27a, b, c, d, and e illustrate a sintered foraminous membrane 812 where arrows 814 indicate a preferred direction of flow across the structure. In FIG. 27a the surface rods 816 are oriented perpendicularly to the support rods 818, whereas in FIGS. 27d and 27e the surface rods 816 are oriented angularly to the support rod 818. It is to be understood that in a cylindrical structure, FIGS. 27d and 27e are illustrative of differently handed spiral orientations of the surface rods 816. FIG. 27b shows the surface rods 816, exemplarily shown as triangles without intending to be limited, attachedly connected perpendicularly to the support rods whereas FIG. 27c illustrates the surface rods 816 attached at an angle such that an edge of the surface rod is angularly tilted into the direction of flow. The angle of the surface rod 816 relative to the support rod 818 in FIGS. 27a, d, and e is preferably 0 degrees to ±30 degrees and is preferably 0 degrees to ±15 degrees. The angle of relief formed by the plane of the top of the surface rod 816 and a perpendicular line drawn from the upstream most edge of the surface rod 816 and perpendicular to the support rod 818 is greater than 30 degrees but less than 90 degrees, and preferably is between 45 degrees up to and including 90 degrees. The distance 820 between edges of the surface rods must be narrower than the smallest dimension of the pellets to be retained by the appropriate foraminous membrane.

Figure 28A:
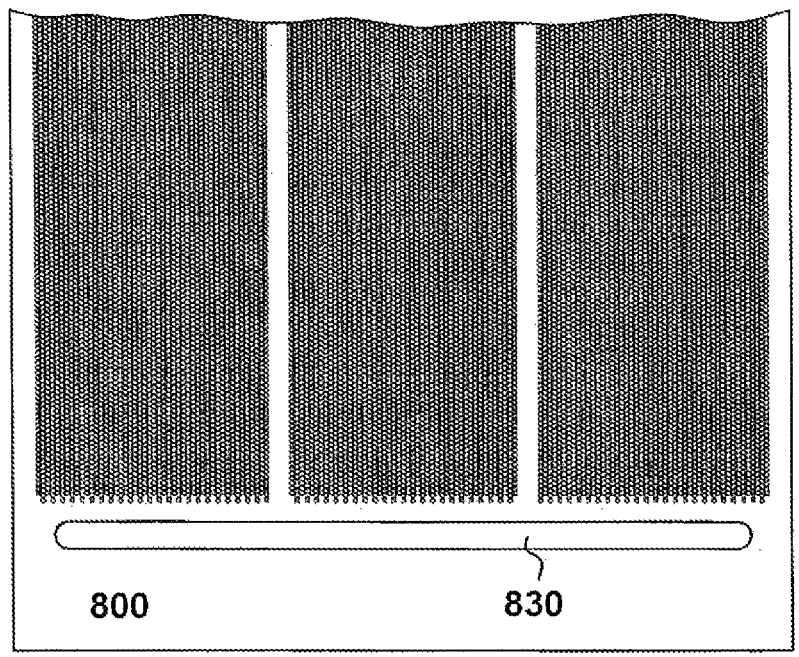
FIG. 28a is an illustration of an embossed deflector near the terminus of a foraminous membrane.
Figure 28B:
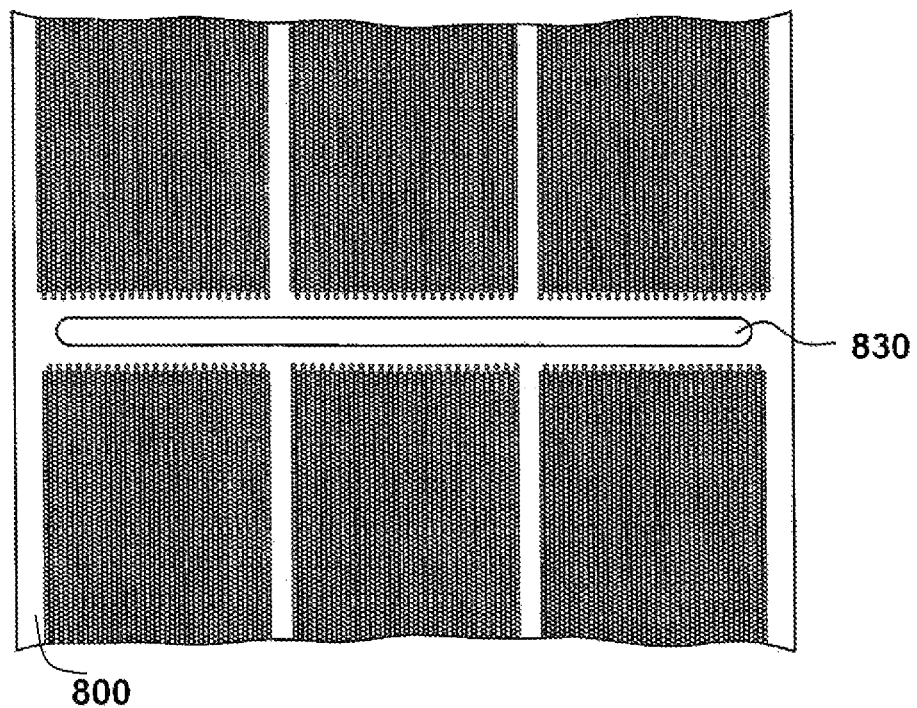
FIG. 28b is an illustration of an embossed deflector in a non-perforate and non-terminal portion of a foraminous membrane.
Figure 29:
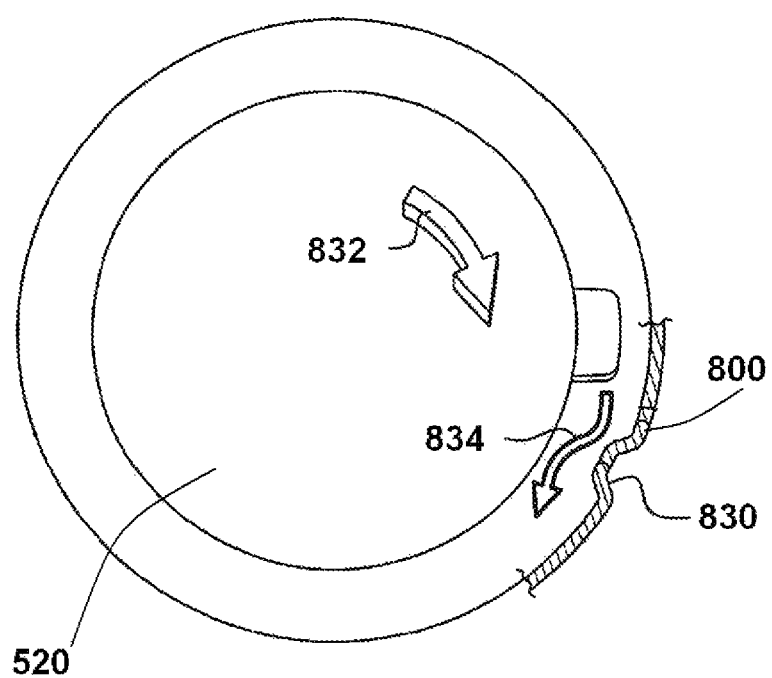
FIG. 29 is a cross-sectional illustration of an embossed deflector on a portion of a cylindrical foraminous membrane.

To facilitate deflection of the pellets off the foraminous membrane 800 in FIG. 18, it is known as disclosed in U.S. patent application Publication No. 2008/0289208, owned by the assignee of the present invention and included herein by way of reference in its entirety, to emboss raised profiles into non-perforate areas of a foraminous membrane such that a raised area is introduced on the inner surface of that foraminous membrane. This is illustrated in FIG. 28a wherein the raised embossed area 830 is placed in a non-perforate terminus of the foraminous membrane 800 and in FIG. 28b wherein the raised embossed area 830 is in a non-perforate mid-portion of the foraminous membrane 800. FIG. 29 further illustrates this for a portion of a cylindrical foraminous membrane 800 wherein the raised embossed area 830 extends into the open area between the foraminous membrane 800 and the rotor 520. Arrow 832 indicates the direction of rotation of the rotor 520 and arrow 834 indicates the deflection of the pellets encountering the raised embossed area 830.

Alternatively, as illustrated in FIG. 30a in accordance with the disclosures in U.S. Pat. No. 6,739,457 also owned by the assignee of the present invention and included herein by way of reference in its entirety, deflector bars 850 can be attached to the non-perforate portions of a foraminous membrane 800. This is better detailed in FIG. 30b wherein an assemblage of a support 852 on the non-perforate portion of foraminous membrane 800 is attached to the angled deflector component 854 utilizing bolt 856 and nut 858 to form the deflector assemblage such that the flow about the screen is deflected away from the screen as illustrated by arrow 860.

Figure 31:
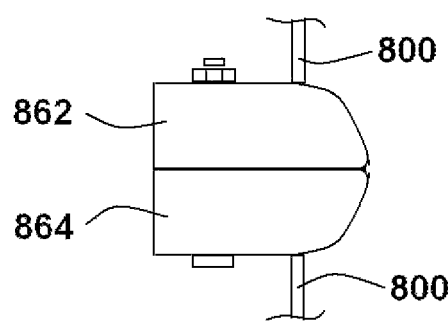
FIG. 31 is a cross-sectional illustration of components of deflector assemblies attached to foraminous membrane for connection of those foraminous membranes.

In the preferred embodiment of the present invention as illustrated in FIG. 31, angled deflector component 862 is weldingly attached to the terminus of a foraminous membrane 800 component and is removably attached boltingly to a complementarily angled deflector component 864 attached to another terminus of the same or different foraminous membrane 800 such that the two termini are boltingly connected with the angle portions pointing symmetrically into the inner area of the foraminous membrane. By virtue of the symmetry, the foraminous membranes can be joined without concern for orientation and similarly can be reversed to maximize the life of the foraminous membrane as illustrated. Only if there is an orientational specificity of the foraminous membrane components will this become a constraint. The assembly is illustrated three-dimensionally in FIG. 32 wherein only the locus of the foraminous membrane attachment is illustrated by the reference number 800.

Returning summarily to FIGS. 1a and 1b, a number of fluid reduction assemblages can be used in fluid reduction section assembly 200 and can be used in many combinations. It is also understood where reduction of fluid is not preferential, the fluid reduction assemblages are removable and the foraminous membrane components can be effectively excluded by incorporation of an equivalent or comparable non-foraminous component. Similarly, a number of feed chute assemblages can be used in the feed chute assembly 300 in many combinations, and this too can effectively be blocked by incorporation of an equivalent or comparable non-foraminous component. In FIG. 18, at least one circumferential foraminous membrane 800 and preferably a multiplicity of circumferential foraminous membranes can be used in the process such that a continuous cylindrical foraminous membrane is formed throughout the entire verticality of the dryer section assembly 400. The bottom-most section of the foraminous membrane in the preferred embodiment is modified to attachingly, preferably boltingly, connected to the inlet 802 from the feed chute assembly 300 as is described hereinbefore. Alternatively at least one upper component of the circumferential foraminous membrane 800 can be replaced with an equivalently circumferential non-perforate component to facilitate processing. These non-perforate equivalents or comparably equivalent structures are an integral consideration wherein particularly tacky or adherent materials are being processed.

Of similar consideration, abrasion-prone and problematic build-up areas through the entire dryer assembly 10, FIGS.

1*a* and 1*b* can be surface treated in accordance with disclosures in World patent application Publication No. WO2009/059020 owned by the assignee of the present invention and included herein by way of reference in its entirety. Surface treatments as described herein can involve at least one or more processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, flame spraying including high velocity applications, thermal spraying, plasma spraying, sintering, dip coating, powder coating, vacuum deposition, chemical vapor deposition, physical vapor deposition, sputtering techniques, spray coating, roll coating, rod coating, extrusion, rotational molding, slush molding, and reactive coatings utilizing thermal, radiational, and/or photoinitiation cure techniques, nitriding, carbonitriding, phosphating, and forming one or more layers thereon. The layers can be similar in composition, different in composition, and many combinations thereof in multiple layer configurations.

Composition of the apparatus components are preferably metal and compositionally can be aluminum, copper, steel, stainless steel, nickel steel alloy, or similarly non-reactive material inert to the components of the drying process. Preferably, the metal is stainless steel, and most preferably is Grade 304 or Grade 316 stainless steel and their low carbon equivalents as necessitated environmentally by the chemical processes undergoing the drying operation.

Upstream processes can include melt and extrusional processes subjected to underfluid pelletization, recycle washes and processing, fluidic thermal treatments, washes, rinses, and the like wherein pellets are contained in a fluid medium to form a slurry. The fluid medium can be a fluid, preferably not flammable, that can be readily evaporated and most preferably is water. The fluid medium can contain additives and processing aids as are known to those skilled in the art. The fluid medium can also be a moderately volatile material that upon subjection to the centrifugal process is significantly reduced in quantity, and thus becomes more practical for additional downstream processes such as rinsing, extraction, and the like.

Pellets as described herein can include flake, granule, and powder and can be many geometries including but not limited to round, oval, square, rectangular, hexagonal, pentagonal, spherical, lenticular, and can be irregularly shaped. The pellet composition can include polymers, filled polymers, reactive polymers, cross-linkable polymers, polymer formulations, recyclables, waxes, asphalts, adhesives, gum bases and gum base formulations, organic solids, inorganic solids, and the like without intending to be limited. The pellets are not limited in size or throughput rate and it is understood that the foraminous membranes must be satisfactorily of small enough particle size to prevent undue loss to the desired particle range.

What is claimed is:

1. A dryer system for removing surface moisture from particulate, the dryer system comprising:
    a dryer comprising a rotor, the rotor comprising a plurality of lifting blades arranged in horizontal rows, the lifting blades for lifting particulate through the system, the particulate generally drying as it is lifted through the system, the rotor comprising at least two sections, a wet particulate feed section into which particulate enters the system, and a drying section located above the wet particulate feed section, wherein the number of lifting blades per a given length of the wet particulate feed section is less than the number of lifting blades per the same length of the drying section;
    wherein at least a portion of the lifting blades of the wet particulate feed section form at least one helical configuration, the helical configuration comprising lifting blades from two or more horizontal rows of lifting blades such that a trailing edge of the lifting blades in one of the horizontal rows are positioned in the closest vertical proximity, relative to the other lifting blades, to a leading edge of the lifting blades in the adjacent higher horizontal row.

2. The dryer system of claim 1, wherein the dryer system comprises a centrifugal dryer.

3. The dryer system of claim 1, wherein the lifting blades of the wet particulate feed section form at least two helical configurations and have a blade angle of less than 45° defined by the inclination of the trailing edge of a blade above that of a plane drawn horizontally through the leading edge of a blade.

4. The dryer system of claim 1, wherein the lifting blades of the wet particulate feed section form at least two helical configurations and have a blade angle of less than 45° defined by the inclination of the trailing edge of a blade above that of a plane drawn horizontally through the leading edge of a blade; and
    wherein the lifting blades of the wet particulate feed section are longer than at least a portion of the blades of the drying section.

5. The dryer system of claim 1, wherein at least a portion of the lifting blades are removably attached to the rotor.

6. The dryer system of claim 1, wherein a lowermost lifting blade of the lifting blades has a tilt angle of from 0° to +40°, and another lifting blade of the lifting blades has a tilt angle of from 0° to ±20°, the tilt angles being defined as the angle of a blade from the outside edge to that of a plane drawn through the attached edge.

7. A dryer system for removing surface moisture from particulate, the dryer system comprising:
    a centrifugal dryer having a particulate lifting cylindrical rotor assembly positioned within a foraminous membrane, the cylindrical rotor assembly comprising a cylindrical rotor assembly having a plurality of lifting blades arranged in horizontal rows, the lifting blades for lifting the particulate through sections of the centrifugal dryer, the particulate generally drying as it is lifted through each section, each lifting blade having a trailing edge, a leading edge, an attached edge, and an outside edge;
    wherein the cylindrical rotor assembly of the centrifugal dryer comprises at least two sections, a wet particulate feed section into which the particulate enters the centrifugal dryer, and a drying section located above the wet particulate feed section, wherein the number of lifting blades per a given length of the wet particulate feed section is less than the number of lifting blades per the same length of the drying section, and wherein the wet particulate feed section comprises two or more horizontal rows of lifting blades, the lifting blades of the two or more horizontal rows progressively spiraling upward around the rotor assembly.

8. The dryer system of claim 7, wherein at least a portion of the lifting blades of the wet particulate feed section form at least one helical configuration.

9. The dryer system of claim 7, wherein the lifting blades of the wet particulate feed section form at least two helical configurations, and have a blade angle of less than 45° as defined by the inclination of the trailing edge of a blade above that of a plane drawn horizontally through the leading edge of a blade.

10. The dryer system of claim 7, wherein the lifting blades of the wet particulate feed section form at least two helical configurations, have a blade angle of less than 45° as defined by the inclination of the trailing edge of a blade above that of a plane drawn horizontally through the leading edge of a blade, and are longer than the blades of the drying section.

11. The dryer system of claim 7, wherein at least a portion of the lifting blades are removably attached to the cylindrical rotor assembly.

12. The dryer system of claim 7, wherein a lowermost lifting blade of the lifting blades has a tilt angle of from 0° to +40°, and another lifting blade of the lifting blades has a tilt angle of from 0° to ±20°, the tilt angles being defined as the angle of a blade from the outside edge to that of a plane drawn through the attached edge.

13. The dryer system of claim 7, wherein to facilitate deflection of particulate off the foraminous membrane, embossed raised profiles are provided into non-perforate areas of the foraminous membrane such that a raised area is introduced on an inner surface of that foraminous membrane.

14. The dryer system of claim 7, wherein to facilitate deflection of particulate off the foraminous membrane, deflector bars are attached to non-perforate portions of the foraminous membrane.

15. The dryer system of claim 7, wherein to facilitate deflection of particulate off the foraminous membrane, an assemblage of releasably attached angled deflector components are attached to non-perforate portions of the foraminous membrane.

16. The dryer system of claim 15, wherein the assemblage is attached via a bolt and nut connection.

17. The dryer system of claim 7, wherein to facilitate deflection of particulate off the foraminous membrane, an angled deflector component is weldingly attached to a terminus of a first foraminous membrane and is removably attached boltingly to a complementarily angled deflector component attached to another terminus of a second foraminous membrane such that the two termini are boltingly connected with the angle portions pointing symmetrically into an inner area of the first and second foraminous membranes.

18. The dryer system of claim 7, the rotor having a bottom and a top, wherein the rotor is drivingly connected to a motor located in proximity of the bottom of the rotor.

19. The dryer system of claim 7, the rotor having a bottom and a top, wherein the rotor is drivingly connected to a motor located in proximity of the top of the rotor.

* * * * *